United States Patent
Schreck et al.

(10) Patent No.: US 11,949,474 B2
(45) Date of Patent: Apr. 2, 2024

(54) MANAGEMENT OF MIMO COMMUNICATION SYSTEMS

(71) Applicant: APPLE INC., Cupertino, CA (US)

(72) Inventors: Jan Schreck, Sunnyvale, CA (US); Nageen Himayat, Fremont, CA (US); Hosein Nikopour, San Jose, CA (US); Feng Xue, Redwood City, CA (US); Ehsan Aryafar, Santa Clara, CA (US); Oner Orhan, San Jose, CA (US); Mustafa R. Akdeniz, San Jose, CA (US); Wook Bong Lee, Pleasanton, CA (US); Jing Zhu, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/811,494

(22) Filed: Jul. 8, 2022

(65) Prior Publication Data
US 2022/0368383 A1    Nov. 17, 2022

Related U.S. Application Data

(62) Division of application No. 16/489,087, filed as application No. PCT/US2018/030250 on Apr. 30, 2018, now abandoned.
(Continued)

(51) Int. Cl.
*H04B 7/0456*    (2017.01)
*H04B 7/0417*    (2017.01)
(Continued)

(52) U.S. Cl.
CPC ......... *H04B 7/0456* (2013.01); *H04B 7/0417* (2013.01); *H04B 7/0617* (2013.01);
(Continued)

(58) Field of Classification Search
CPC .. H04B 7/0456; H04B 7/0417; H04B 7/0617; H04B 7/0626; H04B 7/0452;
(Continued)

(56) References Cited

U.S. PATENT DOCUMENTS

| 8,432,990 B2 | 4/2013 | Tang et al. |
| 8,509,339 B2 | 8/2013 | Kotecha et al. |

(Continued)

FOREIGN PATENT DOCUMENTS

| CN | 102288901 A | 12/2011 |
| CN | 104081853 A | 10/2014 |

(Continued)

OTHER PUBLICATIONS

"Channel estimation for 2x2 M IMO by sharetechnote", retrieved from https://web.archive.org/web/20161218095034/https://www.sharetechnote.com/ html/Communication_Channel Estimation. html, Dec. 18, 2016.
(Continued)

*Primary Examiner* — Nishant Divecha
(74) *Attorney, Agent, or Firm* — Dorsey & Whitney LLP

(57) ABSTRACT

Apparatuses of a user equipment (UE), a cellular base station, and radio access network (RAN) nodes are disclosed. An apparatus of a wireless communication device includes circuitry configured to measure reference signals received from a plurality of antennas of an other wireless communication device, and circuitry configured to cause one or more antennas of the wireless communication device to transmit information regarding the received reference signals back to the other wireless communication device to enable the other wireless communication device to estimate a utility function for different transmit parameter sets.

18 Claims, 17 Drawing Sheets

Related U.S. Application Data

(60) Provisional application No. 62/502,036, filed on May 5, 2017.

(51) Int. Cl.
*H04B 7/06* (2006.01)
*H04L 5/00* (2006.01)
*H04W 72/542* (2023.01)

(52) U.S. Cl.
CPC ......... *H04B 7/0626* (2013.01); *H04L 5/0051* (2013.01); *H04W 72/542* (2023.01)

(58) Field of Classification Search
CPC .... H04B 7/0619; H04B 7/088; H04B 7/0482; H04L 5/0051; H04W 72/542; H04W 72/54
See application file for complete search history.

(56) References Cited

U.S. PATENT DOCUMENTS

| | | | |
|---|---|---|---|
| 10,447,369 B2 | 10/2019 | Wu et al. | |
| 10,771,130 B2 | 9/2020 | Wu et al. | |
| 2008/0225960 A1 | 9/2008 | Kotecha et al. | |
| 2010/0159845 A1 | 6/2010 | Kaaja et al. | |
| 2013/0156120 A1 | 6/2013 | Kaushik et al. | |
| 2013/0343303 A1 | 12/2013 | Kim et al. | |
| 2014/0355707 A1 | 12/2014 | Kim et al. | |
| 2015/0124738 A1 | 5/2015 | Ramakrishna et al. | |
| 2015/0195020 A1 | 7/2015 | Zhu et al. | |
| 2015/0257073 A1 | 9/2015 | Park et al. | |
| 2015/0341105 A1 | 11/2015 | Yu et al. | |
| 2016/0119910 A1* | 4/2016 | Krzymien | H04B 7/0639 370/329 |
| 2016/0198474 A1 | 7/2016 | Raghavan et al. | |
| 2017/0047975 A1 | 2/2017 | Lee et al. | |
| 2017/0317795 A1 | 11/2017 | Wang et al. | |
| 2018/0115958 A1* | 4/2018 | Raghavan | H04B 7/0697 |
| 2019/0081682 A1 | 3/2019 | Wu et al. | |
| 2019/0115963 A1 | 4/2019 | Zhu et al. | |
| 2019/0199553 A1 | 6/2019 | Park et al. | |
| 2019/0207731 A1 | 7/2019 | Park et al. | |
| 2019/0223225 A1 | 7/2019 | Lee et al. | |
| 2019/0319688 A1 | 10/2019 | Sun et al. | |
| 2019/0349035 A1 | 11/2019 | Yang et al. | |
| 2020/0044708 A1 | 2/2020 | Da Silva et al. | |

FOREIGN PATENT DOCUMENTS

| | | | | |
|---|---|---|---|---|
| CN | 104113367 A | | 10/2014 | |
| CN | 105027461 A | | 11/2015 | |
| CN | 105940652 A | | 9/2016 | |
| EP | 2272181 A2 | | 1/2011 | |
| EP | 2528290 A1 | | 11/2012 | |
| EP | 2819313 A1 | | 12/2014 | |
| EP | 3193462 A1 | | 7/2017 | |
| EP | 2819313 B1 | | 11/2019 | |
| EP | 2446549 B1 | * | 11/2021 | ............. H04B 7/024 |
| WO | 2013113277 A1 | | 8/2013 | |
| WO | 2014073846 A1 | | 5/2014 | |
| WO | 2014158208 A1 | | 10/2014 | |
| WO | WO-2014158226 A1 | * | 10/2014 | ............... H04B 1/56 |
| WO | 2015115848 A1 | | 8/2015 | |
| WO | 2016037524 A1 | | 3/2016 | |
| WO | WO-2017025768 A1 | * | 2/2017 | ........... H04B 7/0469 |
| WO | WO-2017088898 A1 | * | 6/2017 | ........... H04B 7/0417 |

OTHER PUBLICATIONS

U.S. Appl. No. 16/489,087, Final Office Action, dated Dec. 8, 2021, 12 pages.
U.S. Appl. No. 16/489,087, Non-Final Office Action, dated Jul. 30, 2021, 13 pages.
U.S. Appl. No. 16/489,087, Non-Final Office Action, dated May 18, 2022, 11 pages.
PCT/US2018/030250, International Search Report and Written Opinion, dated Sep. 25, 2018, 21 pages.
U.S. Appl. No. 16/489,087, Final Office Action, dated Oct. 5, 2022, 16 pages.
U.S. Appl. No. 17/811,484, Non-Final Office Action, dated Feb. 2, 2023, 12 pages.
U.S. Appl. No. 17/811,477, Non-Final Office Action, dated Feb. 16, 2023, 12 pages.
U.S. Appl. No. 17/811,499, Non-Final Office Action, dated Mar. 2, 2023, 11 pages.
U.S. Appl. No. 17/811,477, Final Office Action, dated Jun. 26, 2023, 9 pages.
U.S. Appl. No. 17/811,477, Non-Final Office Action, dated Nov. 16, 2023, 9 pages.

* cited by examiner

MANAGEMENT OF MIMO COMMUNICATION SYSTEMS

BACKGROUND

Various embodiments generally may relate to the field of wireless communications.

DETAILED DESCRIPTION OF PREFERRED EMBODIMENTS

Figure 1:
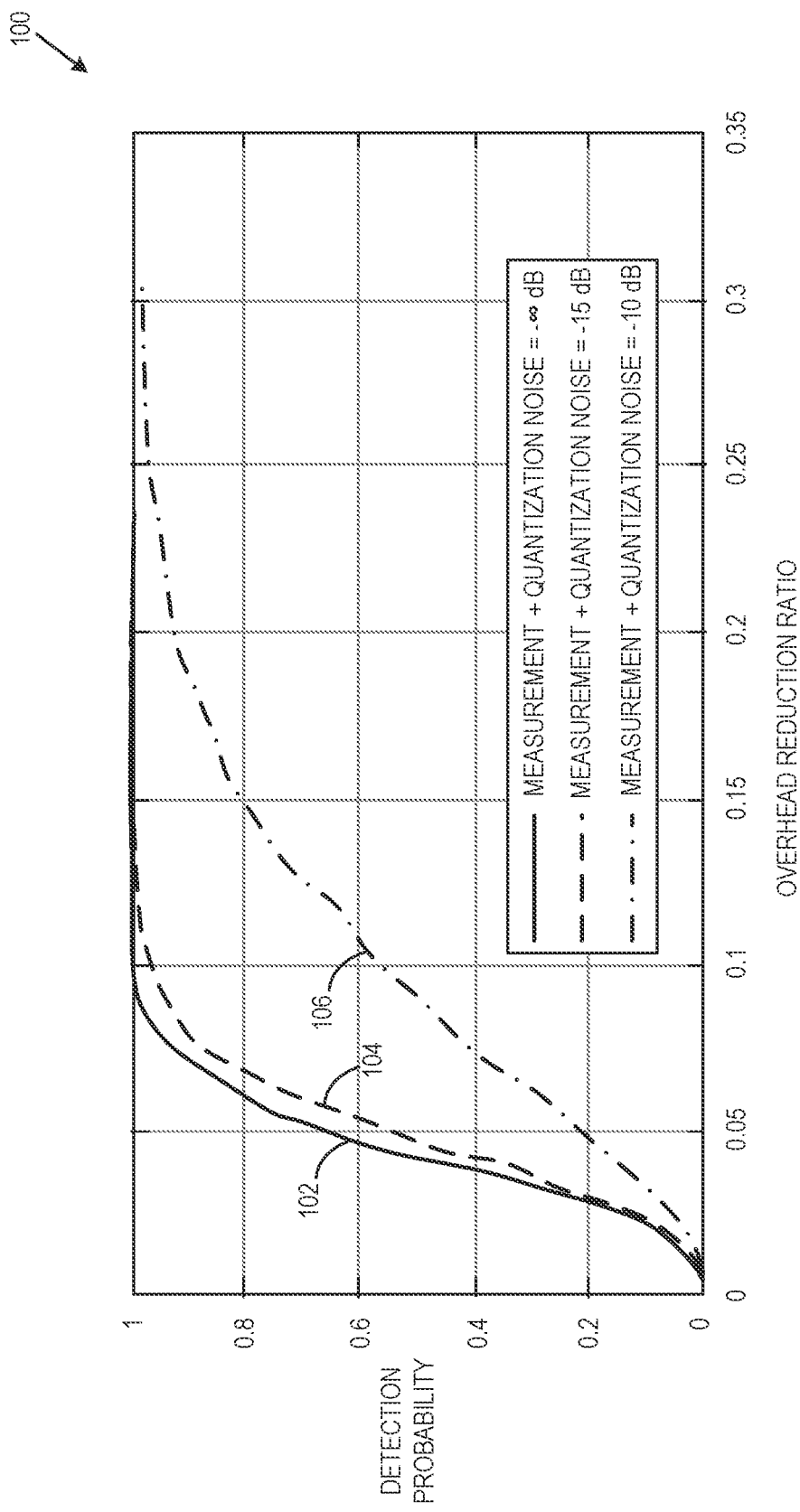
FIG. 1 is a simplified plot illustrating a probability that a Transmit/Receive Point (TRP) detects a correct beamforming vector for each UE.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

With an increasing number of antennas per network node advanced channel adaptive transmit strategies, like multi-user multiple input multiple output (MIMO) (MU-MIMO) or coordinated multi-point transmission (CoMP), are key to increasing the spectral efficiency of wireless networks. To implement advanced channel adaptive transmit strategies, information about the wireless channels (e.g., channel state information (CSI)) may be acquired by the transmitting nodes (sometimes referred to herein as "Transmit/Receive Points" (TRPs)). An example of a TRP is a cellular base station or Radio Access Network (RAN) node (e.g., an evolved NodeB (eNB), a next generation NodeB (gNB), etc.).

Embodiments disclosed herein may address measuring, estimating and feeding back CSI in multi-user massive MIMO systems. Embodiments may facilitate the measurement and feedback overhead to a minimum to efficiently implement advanced channel adaptive transmit strategies.

Challenges exist in addressing measuring, estimating and feeding back CSI for multi-user massive MIMO systems. In 3GPP, beam management and CSI feedback are two procedures. Beam management is defined by a set of L1/L2 procedures to acquire and maintain a set of TRP(s) and/or UE beams that can be used for downlink (DL) and uplink (UL) transmission and reception. Given a beam configuration, CSI measurements are performed and transmit parameters are determined. Since the beams are fixed before a scheduling decision is made, transmit strategies that require a joint optimization of beams and other transmit parameters cannot be implemented. In legacy implementations, flexibility of transmitters and therefore implementation of advanced channel adaptive transmit schemes may be limited. Another legacy implementation involves Wireless Gigabit (WiGig).

The beam refinement protocol (BRP) takes significant effort to measure the channel matrix at the receivers such that beams can be optimized. In legacy implementations, this may not scale well with the number of antennas. The required number of measurement signals scales linearly with the number of antennas.

Legacy implementations may address measurement, estimation, quantization and the feedback separately:
 To measure the wireless channel, reference signals (RS) may be transmitted from all antenna ports using orthogonal resources such that the channels between any antenna port pair can be measured.
 The measurements are used by the UE to estimate some representation of the wireless channel.
 Significant effort is taken by the UE to quantize the channel estimations.
 Finally, CSI is transmitted back to the TRP which decides on the transmit parameters based on the information.

Legacy academic approaches may apply compressive sensing to the problem of massive MIMO channel estimation and references therein. Such approaches rely on the sparsity of the channel and aim to reconstruct the entire channel. Legacy algorithms used to decode compressed sensing measurements may be computationally too complex to enable efficient real-time implementations. Moreover, legacy compressed sensing based approaches rely on the assumption that certain structures are available in the channels and typically fail, if such structures change or are absent.

Embodiments disclosed herein may include processes to measure, feedback, and infer from CSI. In some embodiments, a measurement protocol that uniformly samples the channel space, and at the same time performs a dimensionality reduction of the channel space, may be implemented. In some embodiments, the receiver may not attempt to estimate the channel. Rather, the receiver may mirror measurements back to the transmitter. In some embodiments, the transmitter may find transmit parameters by estimating a scheduling metric without reconstructing the channel space (e.g., a channel matrix).

Embodiments of the disclosure may have one or more of the following advantages:

Scaling with the number of transmit antennas. For example, TRPs with a large number (e.g., thousands) of transmit antennas may be supported.

Measurement overhead can be reduced, for example by up to 90%, compared to legacy implicit and explicit feedback schemes. Sufficient measurements of the channel may be generated without having to transmit orthogonal RS from each antenna port.

A different beamforming codebook may be used in the measurement phase. Hence, measurement and transmit codebooks can be optimized for their intended purpose. For example, the transmit codebook can be optimized for coverage and beamforming gain without constraining the number of elements. The measurement codebook can be optimized to enable accurate estimations with a minimum number of measurements.

The channel estimation complexity may be significantly reduced and the UE may not implement complex channel estimation procedures. Complexity and latency at the UE may be reduced. Computationally complex tasks are moved to the TRP (i.e., infrastructure).

A TRP may have all degrees of freedom for user scheduling and network control. Processing at the TRP can be performed by linear real-time capable estimation schemes.

As will be discussed below, in some embodiments, a measurement and feedback protocol may enable the network to perform very close to optimal MU-MIMO with ideal CSI. For example, consider the following system setup in Table 1:

TABLE 1

| | |
|---|---|
| # TRP RF | 8 |
| # TRP antenna | 128 (16 per RF) |
| # UE antenna | 1 |
| # UE | 4 |
| Channel model | 3GPP Line of Sight (LOS) |
| Transmit codebook | OFT codebook with 128 elements |
| Measurement codebook | Random codebook with M (parameter) elements |
| Carrier frequency | 73 GHz |
| Transmit SNR | −20 dB |
| Rx SNR of 5th percentile | ≈4 dB |
| Scheduler | Greedy max rate |

FIG. 1 is a simplified plot 100 illustrating a probability that a TRP detects a correct beamforming vector (e.g., the beamforming vector with a maximal beamforming gain) for each UE. The plot 100 includes a first plot 102 corresponding to a measurement plus quantization noise of negative infinite decibels (−∞ dB), a second plot 104 corresponding to a measurement plus quantization noise of negative fifteen decibels (−15 dB), and a third plot 106 corresponding to a measurement plus quantization noise of negative ten decibels (−10 dB). The x-axis (horizontal axis) shows the reduction of the measurement overhead ratio compared to a beam sweeping scheme with 128 beams (which may include 128 measurements). The y-axis (vertical axis) shows a detection probability. As illustrated in the plot 100, with −15 dB (or less) measurement-plus-quantization noise (the second plot 104), the measurement and feedback overhead can be reduced by nearly 90% without sacrificing much detection probability.

Figure 2:
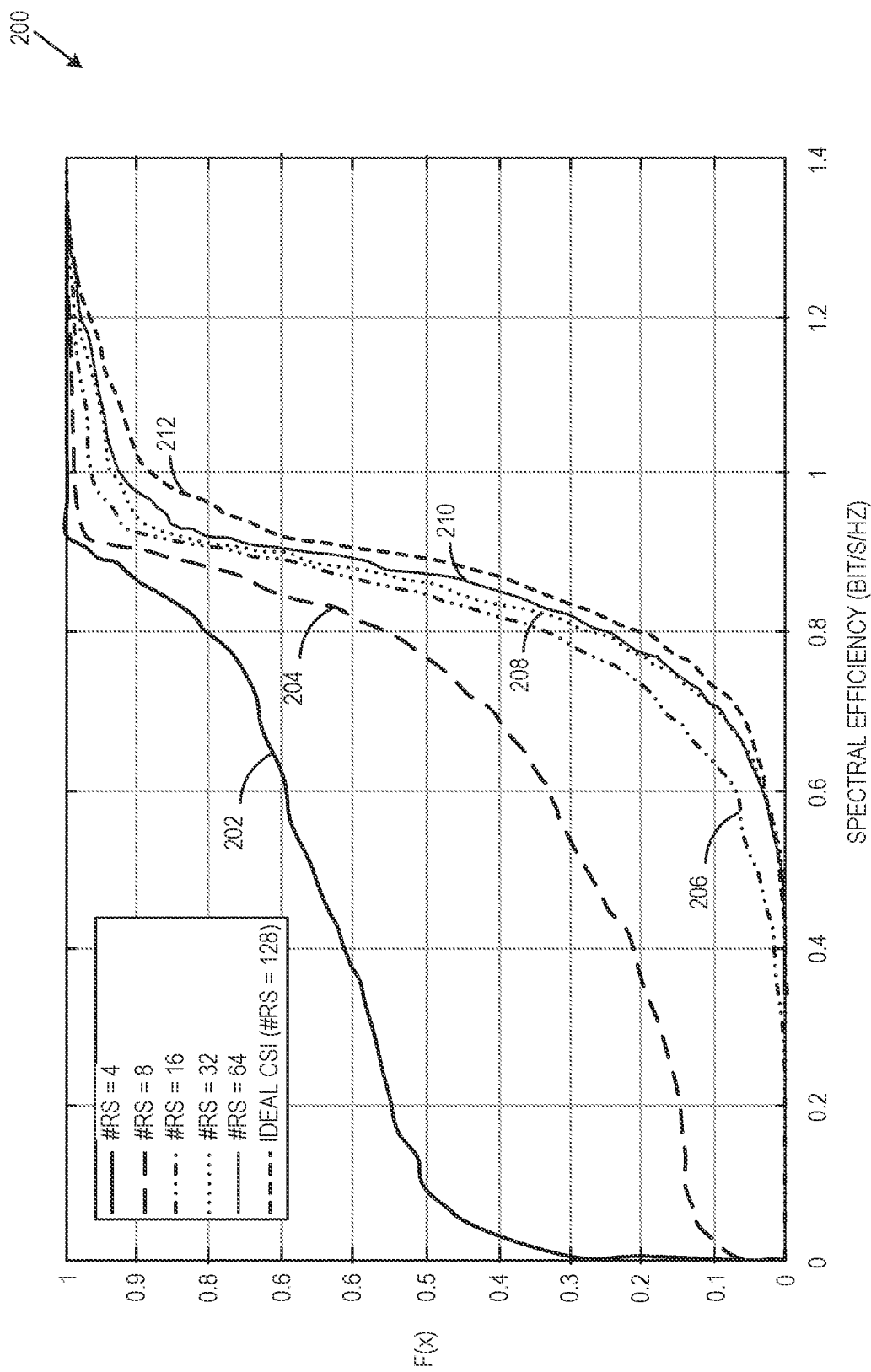
FIG. 2 is a simplified plot of cumulative distribution functions of the network spectral efficiency of a multi-user multiple input multiple output (MU-MIMO) millimeter wave (mm-wave) system, according to some embodiments.

FIG. 2 is a simplified plot 200 of cumulative distribution functions 202, 204, 206, 208, 210, and 212 (CDFs 202, 204, 206, 208, 210, and 212) of the network spectral efficiency of a MU-MIMO millimeter wave (mm-wave) system, according to some embodiments. The parameters of the system are as indicated above in Table 1. The CDFs 202, 204, 206, 208, 210, and 212 correspond to numbers 4, 8, 16, 32, 64, and ideal CSI 128 of resource signals (RS), respectively. In some embodiments, scheduling may be performed in a greedy fashion based on signal-to-interface-plus-noise ratio (SINR) estimations. In some embodiments, the measurement and feedback noise may be assumed to be zero. In some embodiments, the greedy scheduler may schedule multiple UEs on the same resource as long as the estimated spectral efficiency increases. In some embodiments, the users may be separated in the spatial domain through a wide-band analog codebook based beamforming and digital sub-band zero forcing.

In some embodiments, sixteen reference signals (16 RS) (corresponding to CDF 206) may provide sufficient information to achieve performance very close to ideal CSI. In some embodiments, this may reduce the measurement and feedback overhead significantly, since legacy beam management schemes involve 128 measurements. Hence, in some embodiments, an overhead reduction of 87.5% may be achieved.

For example, consider a wireless network having a single TRP and multiple UEs. In this example, it is assumed that each of the UEs has a single receive antenna and the TRP is equipped with a number N of antennas. For the ease of presentation, assume a block fading channel model such that the channel from the TRP to UE can be given by the vector $h_i \in \mathbb{C}^N$. In some embodiments, a protocol may be tailored for a scenario where the TRP uses linear beamforming and possible beamforming vectors w are defined by a codebook $C \subset \mathbb{C}^N$. Note that most beamforming schemes with a limited feedback constraint can be stated as beamforming schemes with a fixed transmit codebook.

In some embodiments, the TRP may optimize a channel adaptive transmit strategy without estimating the channels at the UEs or the TRP. In some embodiments, this may be enabled by feeding back certain measurements from the UE to the TRP. An example implementation of some such embodiments of measurement, feedback and estimation protocols is illustrated in FIG. 3.

Figure 3:
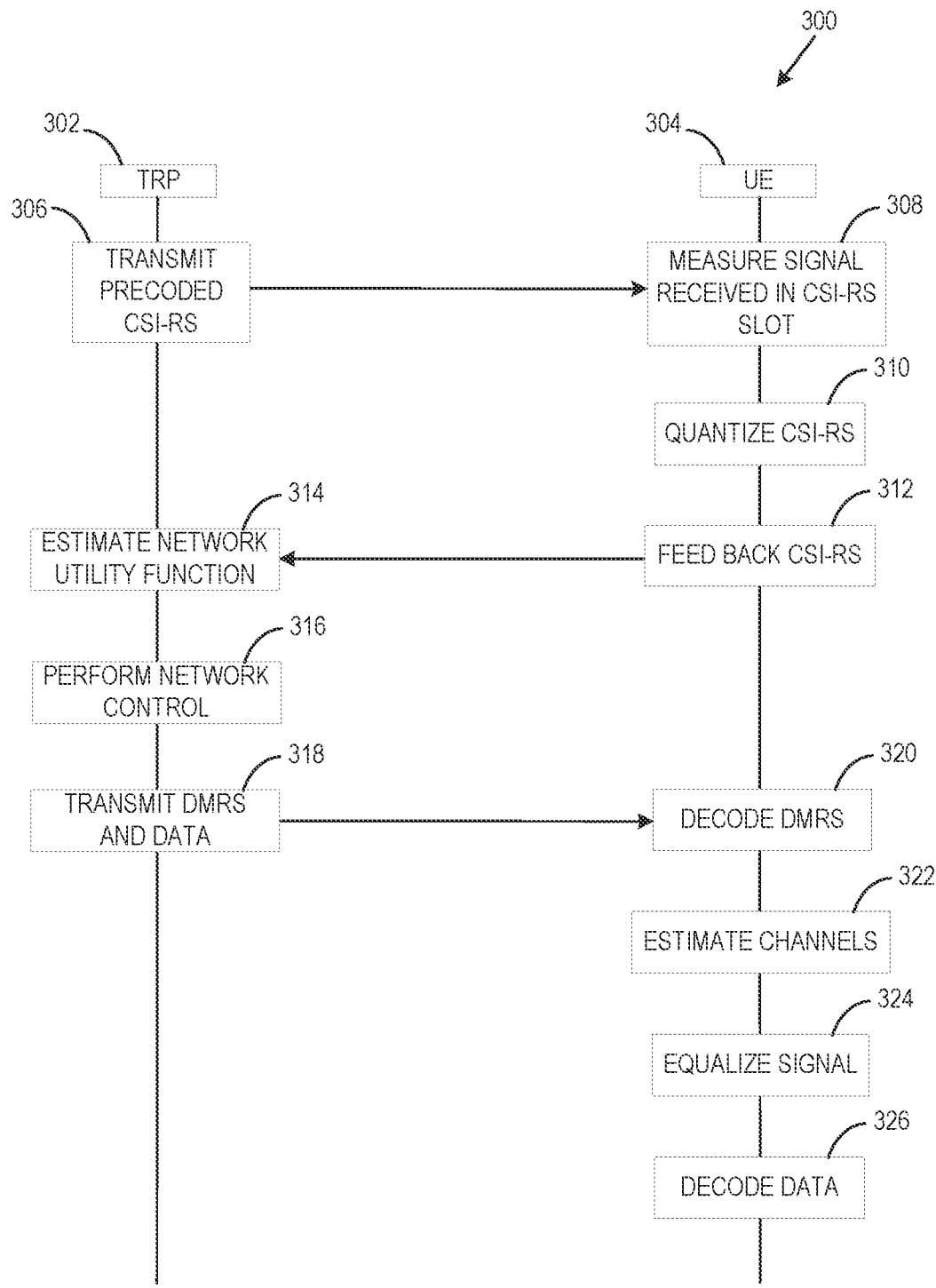
FIG. 3 is a simplified signal flow diagram illustrating a measurement, feedback, and estimation protocol in a wireless communication system, according to some embodiments.

FIG. 3 is a simplified signal flow diagram illustrating a measurement, feedback, and estimation protocol in a wireless communication system 300, according to some embodiments. The wireless communication system 300 includes a TRP 302 and a UE 304. These and some related embodiments may be summarized as follows:

The TRP 302 may transmit 306, to the UE 304, a sequence of RSs (e.g., non-orthogonal RSs) from all antenna ports simultaneously.

The UE 304 may measure 308 received signals (e.g., received in a CSI-RS slot) resulting from the RSs.

The UE 304 may directly quantize 310 the received signals.

The UE 304 may feedback 312 the measurements to the TRP.

The TRP 302 may estimate 314 a scheduling utility function (also referred to herein as "network utility function") that depends on certain network parameters (e.g., a certain transmit strategy, number of select users, assignment of users to precoding vectors, etc.).

The TRP 302 performs 316 network control.

The TRP 302 transmits a demodulation reference signal (DMRS) to the UE 304.

The UE 304 decodes 320 the DMRS.

The UE 304 estimates 322 channels.

The UE 304 equalizes 324 the signal.

The UE 304 decodes 326 data from the signal.

Aspects of embodiments that address measurement, feedback and estimation protocol in more detail are given below. For ease of presentation, the aspects may focus on a baseband channel model. Extensions to wideband channel models or two other models, however, may be used in some embodiments.

Embodiments with Respect to Measurement

In some embodiments, in the measurement phase the TRP 302 may use a number M of resource elements (denoted as CSI-RS ports) to transmit a sequence of M RSs from all (or a subset of) antenna ports simultaneously. For example, assuming N antenna ports are be used to transmit the pilot signals (e.g., the RSs), the signal that is transmitted on the m-th resource element may be expressed by the N dimensional row vector $\emptyset_m \in C^{1 \times N}$. The j-th element of the transmitted pilot signal $\emptyset_{mj}$ can be given by some complex number that is transmitted on the j-th antenna element on the m-th resource element. All M pilot signals are collected in a so-called measurement matrix $\emptyset = (\emptyset_1^T, \ldots, \emptyset_M^T)^T \in C^{M \times N}$. For embodiments disclosed herein, the measurement matrix is an M×N matrix and M<<N. Most legacy schemes (like the BRP in WiGig) assume that the measurement matrix $\emptyset$ is an orthonormal N×N matrix.

Embodiments with Respect to Feedback

In some embodiments, to describe the feedback protocol, an arbitrary but fixed UE may be considered. The signal received by the UE in the m-th CSI-RS port may be given by $y_{im} = \emptyset_m h_i + n_{im} = \Sigma_j \emptyset_{mj} h_{ij} + n_{im}$, where $n_{im}$ is additive noise. The M dimensional measurement vector containing all received signals from all CSI-RS ports can be written as $y_i = \emptyset h_i + n_i \in C^{M \times 1}$. In some embodiments, the vector $y_i$ may be directly quantized and fed back to the TRP such that the feedback message from UE i available to TRP may be $z_i = y_i + q_i$, where $q_i$ may be additional quantization noise.

These embodiments are in contrast to legacy feedback schemes that use the measurement vector y to estimate the channel or some representation of the channel prior to generating the feedback message. As a result, in some embodiments UEs having less computational capability than legacy UEs may be used.

Embodiments with Respect to Estimation

In some embodiments, based on the feedback messages $z_i$ from multiple UEs i=1, 2, . . . , K the TRP can estimate a variety of utility functions. In some embodiments, a utility function that may depend on the effective channel gains with the channel $h_i$ and the beamforming vector w, can be estimated. This may be facilitated by defining a function $f(z_i, w)$, depending on the quantized measurements $z_i$ and the beamforming vector w, that may approximate the effective channel gains $|h_i^H w| \approx f(z_i, w)$. Examples may include the signal to interference noise ratio (SINR), which may be given by $$SINR_i = \frac{|h_i^H w_i|^2}{1 + |h_i^H w_j|^2} \approx \frac{f(z_i, w_i)^2}{1 + \sum_{j \neq i} f(z_j, w_j)^2},$$

where $w_i$ is the beamforming vector assigned to UE i and are beamforming vectors assigned to UEs scheduled on the same resource element.

In some embodiments, another example may be the leakage interference power $\Sigma_{j \neq i} f(z_j, w_i)^2$. The function $f(z_j, w_j)$ can be realized in many ways. This function can be given by a linear function of the form $f(z_j, w_j) = |(\Psi z_j)^H w|$, where $\Psi$ is an N×M matrix that may depend on the measurement matrix $\emptyset$.

Another class of functions may be given by convex optimization algorithms like the constrained $l_1$ minimization, which is commonly found in the context of compressed sensing applications.

Machine learning algorithms can also be used to realize estimation functions. In this case, the function may be trained or learned based on a training set. Ultimately, the estimation function may depend on the available background information, the computational capabilities of the TRP, and other side constraints like the desired estimation latency or accuracy.

Receive Beam Management

Wireless transceivers with a large number of physical antennas will be employed in future wireless systems. The high power consumption and cost of radio frequency (RF) chains prevents using traditional digital MIMO baseband beamforming techniques. Hybrid digital-analog beamforming schemes divide the beamforming between the analog and digital domain. In the analog domain, beamforming schemes can be implemented using both power and cost efficient techniques. Since the analog beamforming processing happens before the RF chain and the analog to digital converter (ADC), the signal received at a single antenna cannot be observed. The signal can only be observed after analog receive beamforming. Consequently, the MIMO channel cannot be directly measured at the receiver. To determine the optimal receive filter, a codebook of receive beamforming vectors is defined and an exhaustive search over all codebook elements is performed. To fully exploit the combining gain, the number of codebook elements is usually in the order of the number of physical receive antennas. Therefore, the measurement overhead scales with the number of receive antennas and, for a large number of antennas, causes significant pilot signal overhead.

The core of most legacy solutions is to define a codebook of receive beamforming vectors and to perform an exhaustive search over all codebook elements (e.g., sector level sweep). More efficient solutions perform the search in multiple stages.

In WiGig a sector level sweep is used to determine the optimal receive beamforming vector. A so-called beam refinement protocol (BRP) is used to further refine the beamforming vectors. The BRP involves transmitting another sequence of reference signals such that the receiver can measure the effective channel after analog receive beamforming.

In 3GPP new radio (NR) it has been agreed that a set of L1/L2 procedures to acquire and maintain a set of transmit and receive beams will be specified. Most likely first implementations will rely on a sector level sweep.

In academia, there have been many proposals to apply compressive sensing to the problem of massive MIMO channel estimation. These approaches typically rely on the structure or sparsity of the channel, and usually aim to reconstruct the entire channel matrix or channel covariance matrix.

The problem of transmit beam management based on a compressed measurement protocol has been considered. A compressed sensing inspired scheme has been proposed that adopts a compressed sensing based measurement protocol but on the reconstruction side relies on simple linear schemes. This scheme reduces the number of measurements significantly (e.g., up to 90%) but at the same time enables the transmitter to detect the optimal analog transmit beamforming vectors, with high probability.

Legacy solutions proposed in WiGig and 3GPP utilize either a vast measurement overhead or limit the flexibility of the receiver significantly.

Beamforming training in IEEE 802.11ad WiGig is divided in two phases. First, during a sector-level sweep (SS), initial transmit/receive beams are determined. In a subsequent beam refinement phase (BRP), the selected beams are refined. In 3GPP, NR SS based procedures are under discussion for beam training. BRP is not precluded. Note that in some solutions receive SS is also considered an important step towards acquiring the initial UE receive beamforming direction, as it avoids the UE scanning a large number of directions in the responder SS phase in WiGig.

During a receive sector-level sweep (RXSS) the transmit node transmits RS on the best known transmit beam to allow the receive node to test for the optimum receive beam. Potential receive beams are defined by a beamforming codebook with a number $N_{CB}$ of elements. For each receive beam measurement at least one RS needs to be transmitted by the transmit node. Therefore, receive beamforming codebooks are usually designed to have a small number of elements.

Algorithms used to decode compressed sensing measurements are computationally too complex to enable efficient real-time implementations. Moreover, compressed sensing based approaches rely on the assumption that certain structures (e.g., sparsity, low rankness) are available in the channels and typically fail, if such structures are absent.

Disclosed herein are methods and related apparatuses and systems that enable the receiver to determine the optimal receive beamforming vector from a codebook with $N_{CB}$ elements by taking a much smaller number of measurements $M \ll N_{CB}$. The determination of the optimal receive beamforming vector may be made without prior knowledge of previously used receive beamforming vectors or location information. Prior knowledge, however, can be used to further reduce the number of measurements.

Embodiments disclosed herein significantly reduce the measurement overhead. In fact, the number of resources that need to be allocated for beam management can be significantly smaller than the number of potential receive beams.

As will be discussed below, the measurement overhead can be reduced by up to about 96% as compared to an exhaustive search.

Embodiments disclosed herein are designed for application in massive MIMO systems, including 3GPP NR and IEEE 802.11ad WiGig. These embodiments minimize the measurement overhead to a minimum to efficiently implement channel adaptive receive strategies, such as hybrid analog-digital beamforming.

Embodiments disclosed herein allow the receive node (e.g., the UE) to determine an optimal receive beam from a beamforming codebook without measuring each potential receive beam. The number of measurements that are performed in such embodiments can be much smaller than the number of potential receive beams. In fact, the number of codebook elements $N_{CB}$ (i.e., potential receive beams) can be made very large without the need to increase the number of measurements.

Figure 4:
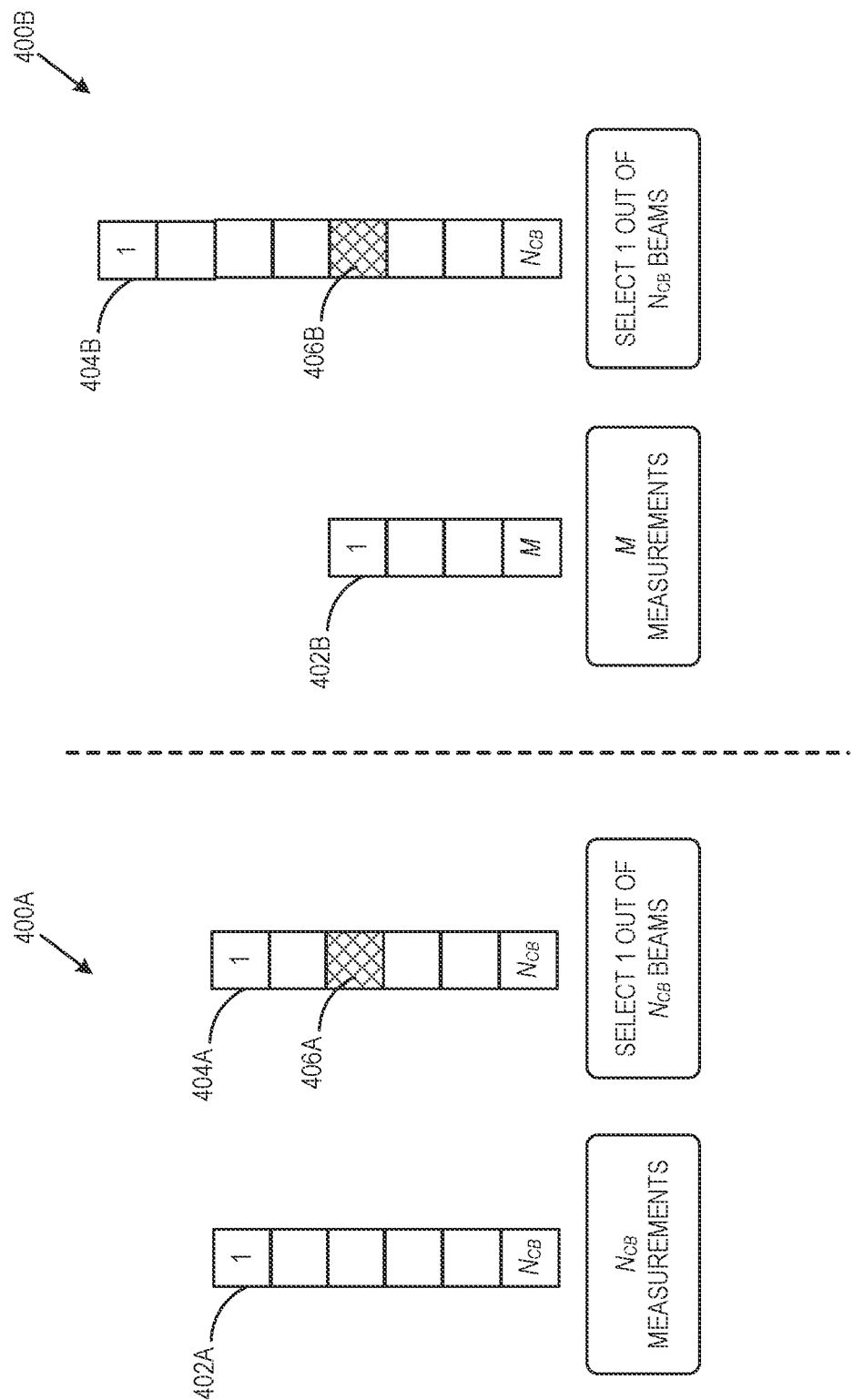
FIG. 4 is a simplified illustration of a comparison of a number of measurements to select a beam using a sector level sweep and a proposed method, which is disclosed herein.

FIG. 4 is a simplified illustration of a comparison of a number of measurements to select a beam using a sector level sweep 400A and a proposed method 400B, which is disclosed herein. FIG. 4 compares measurement overhead and codebook size. As illustrated in FIG. 4, in the sector level sweep 400A, $N_{CB}$ measurements 402A are used to select one selected beam 406A out of $N_{CB}$ beams 404A. As also illustrated in FIG. 4, in the proposed method 400B, only M measurements 402B are used to select one beam 406B out of $N_{CB}$ beams (e.g., M may be much smaller than $N_{CB}$). As illustrated in FIG. 4, the proposed method 400B enables selection using fewer measurements, and with a higher resolution codebook (CB) (e.g., higher number of beam entries in the codebook) as compared to the selector level sweep 400A.

The number of measurements 402B used in the proposed method 400B is also smaller than what is used in a BRP, which is discussed above. Table 2 below compares the number of measurements used for selecting a beam in RXSS, receive BRP (RX BRP), and the proposed method.

TABLE 2

|  | RXSS | RX BRP | Proposed method |
|---|---|---|---|
| #Measurements | $N_{CB}$ | $N_R$ | M (M $\ll N_R$ and M $\ll N_{CB}$) |

A simulation illustrates advantages of the proposed method. Parameters and configurations of this numeric evaluation are shown below in Table 3. Results of the simulation are illustrated in FIG. 5.

TABLE 3

| # TX antennas | 256 in a uniform linear array (ULA) |
|---|---|
| # RX antenna | {64, 256, 1024} (ULA) |
| Channel model | 3GPP LOS |
| TX codebook | DFT |
| RX codebook | DFT |
| SNR | −20 dB |
| Post BF SNR | 0 dB |

Figure 5:
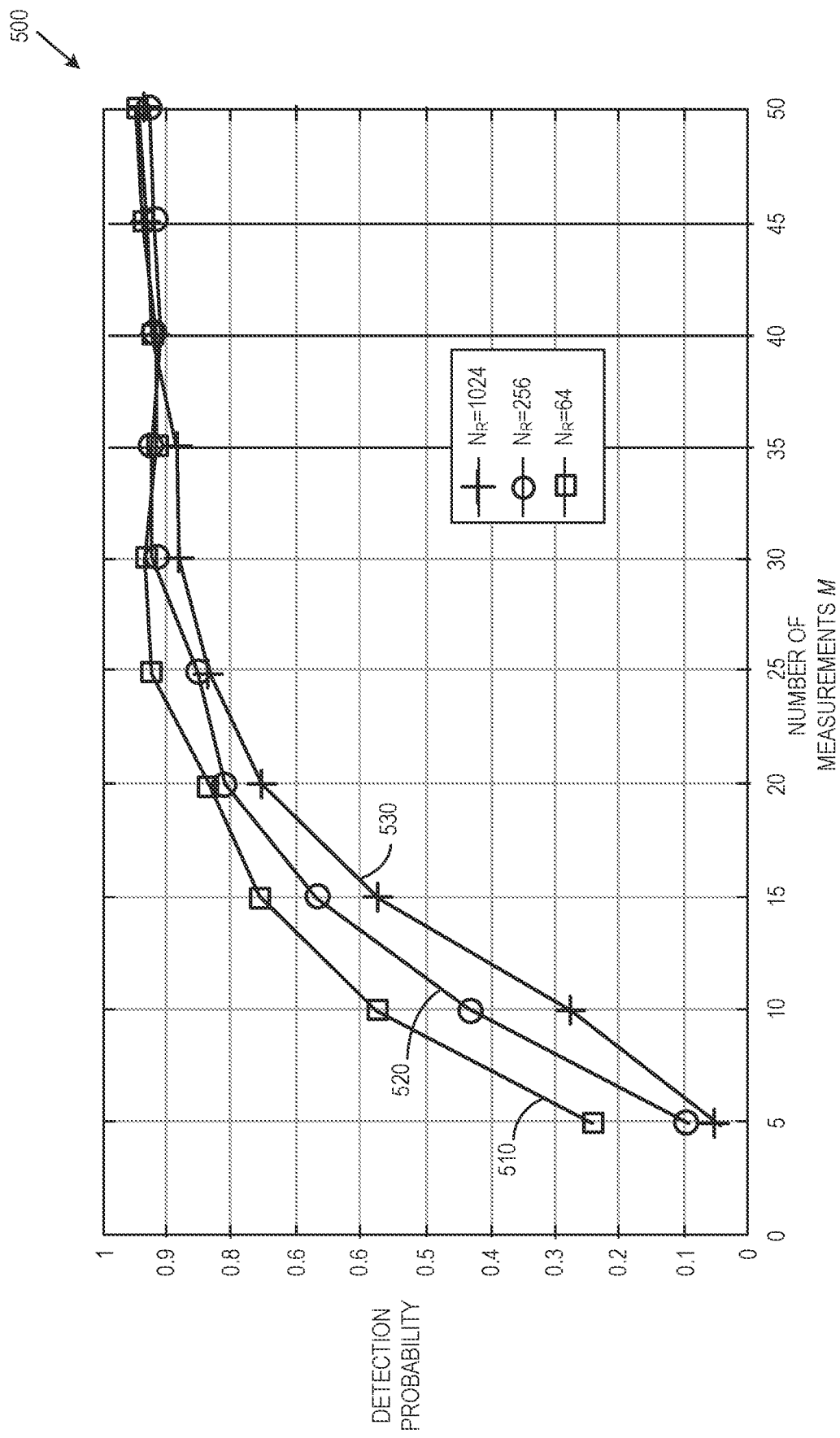
FIG. 5 is a simplified plot illustrating a probability that a receive node detects the beam that maximizes the beamforming gain over the number of taken samples, according to some embodiments.

FIG. 5 is a simplified plot 500 illustrating a probability that a receive node (e.g., a UE) detects the beam that maximizes the beamforming gain over the number of taken samples M, according to some embodiments. The plot 500 includes a plot 510 of an embodiment including $N_R=64$ receive antennas, a plot 520 of an embodiment including $N_R=256$ receive antennas, and a plot 530 of an embodiment including $N_R=1024$ receive antennas. Independent of the number of receive codebook elements $N_{CB}$, which is equal to the number of receive antennas $N_{CB}=N_R$, the number of measurements used for detection probability 90% is M≥30. In other words, thirty measurements are sufficient independent of the number of receive antennas. This translates into a remarkable reduction of the number of measurements as compared to legacy systems, as summarized in Table 4 below. Table 4 indicates measurement overhead reduction for different numbers of receive antennas and a DFT receive codebook with a number of codebook entries being equal to the number of receive antennas ($N_{CB}=N_R$).

TABLE 4

| #RX antennas | 64 | 256 | 1024 |
| --- | --- | --- | --- |
| Measurement overhead reduction | 60% | 88% | 96% |

Embodiments of the disclosure may also be used to:
Detect if the wireless channel is in a line of sight (LOS) state or no line of sight (NLOS) state, including to detect if the receive node is experiencing a blockage event.
Detect receive beams that are vulnerable to strong interference from another transmit node.

Consider a single link of a wireless network with a single transmit and receive node. For the ease of presentation we consider a single receive and a single stream transmission, but point out that extensions to multiple receive nodes and/or multi-stream transmissions can be realized by performing the described actions at each receive node and for each stream. Similarly, if the receive node is equipped with multiple receive panels, the described method can be utilized for each receive panel. An initial handshaking may be assumed to have been performed, and the transmit node has determined a transmit beam that provides a reasonable channel gain.

Embodiments of the disclosure enable a receive node to determine an optimal receive beam from a possibly large codebook without the need to perform a measurement for each potential beam. In fact, the number of measurements M that need to be performed can be much smaller than the number of potential receive beams (M<<$N_{CB}$), as illustrated in FIG. 5.

Figure 6:
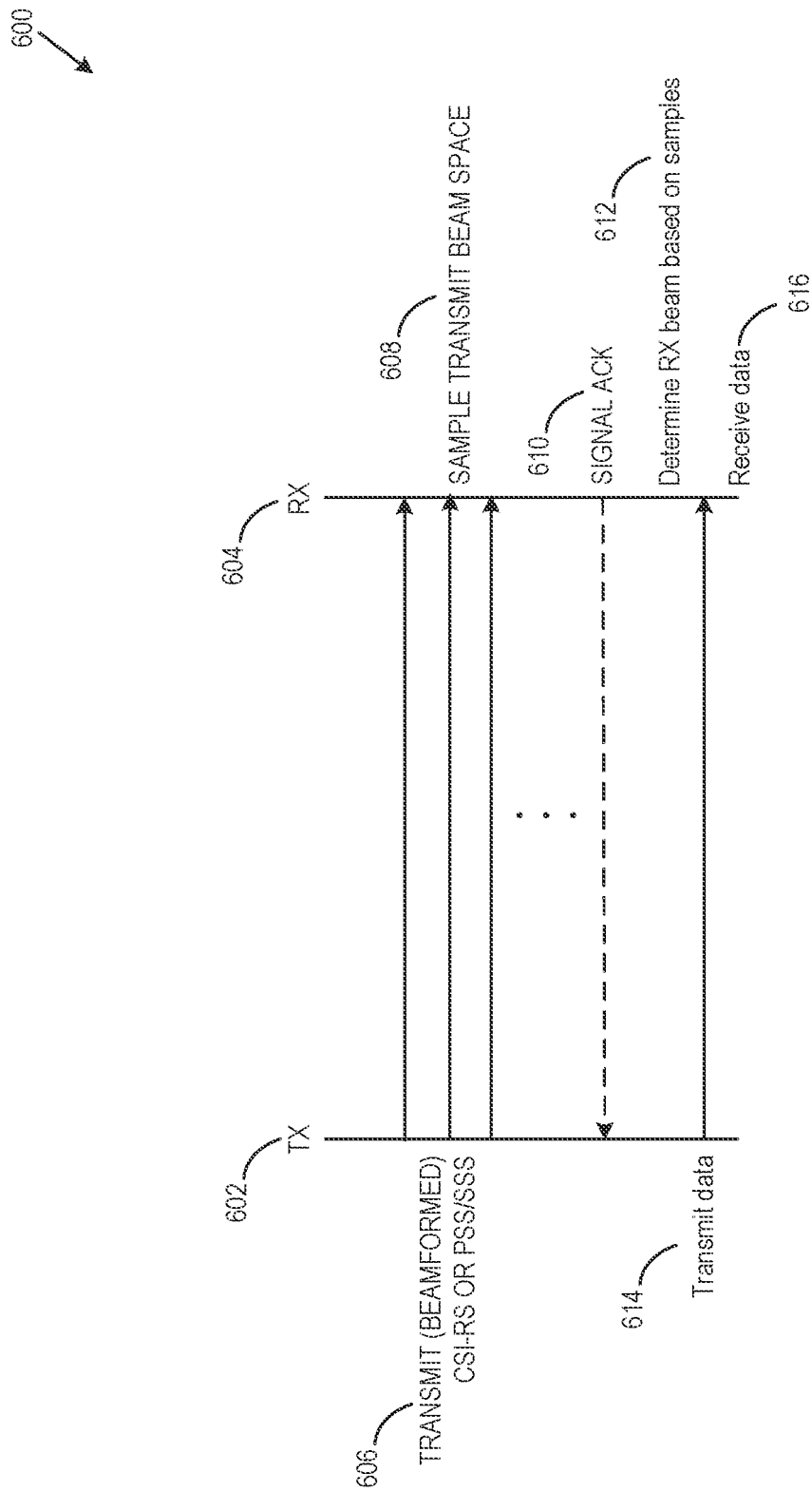
FIG. 6 is a simplified signal flow diagram illustrating signaling for receive node selection in a wireless communication system, according to some embodiments.

FIG. 6 is a simplified signal flow diagram illustrating signaling for receive node selection in a wireless communication system 600, according to some embodiments. It is assumed that a receive node 604 has $N_R$ antennas and the transmit node 602 is equipped with $N_T$ antennas. For the ease of presentation assume a base band channel model such as that for a fixed discrete time and frequency, the channel between the transmit node 602 and the receive node 604 can be given by the $N_R \times N_T$ matrix H. Let w be the beamforming vector used by the transmit node to transmit towards the receive node.

The proposed compressed receive beam management scheme can be divided into the following acts, as illustrated in FIG. 6:
Uniformly sample the receive beam space. As illustrated in FIG. 6, the transmit node 602 transmits 606 pilot signals (e.g., beamformed CSI-RS or PSS/SSS), and the receive node 604 samples 608 the transmit beam space. Although FIG. 6 shows three of these pilot signals transmitted 606, there may be more or less. By way of non-limiting example, the number M of these samples may be about 30, as discussed above with reference to FIG. 5.
Signal 610 an acknowledgment (ACK), from the receive node 604 to the transmit node 602, if the quality of samples is sufficient. This act may be optional.
Use samples to determine 612 a best receive beam from the codebook.
Transmit node 602 transmits 614 data to the receive node 604.
Receive 616 data from the transmit node 602 by the receive node 604.

The reminder of this Section is used to describe each act of FIG. 6 in detail.

RX Beam Space Sampling

To enable the receive node 604 to determine 612 a good receive beam the transmit node 602 transmits 606 a sequence of M RS symbols. The receive signal of the i-th measurement can be written as $y_i=a_i Hw+n_i$, where $a_i$ is the i-th measurement combining vector. After performing M measurements, the vector of measurements is:

$$y=AHw+n$$

Figure 7:
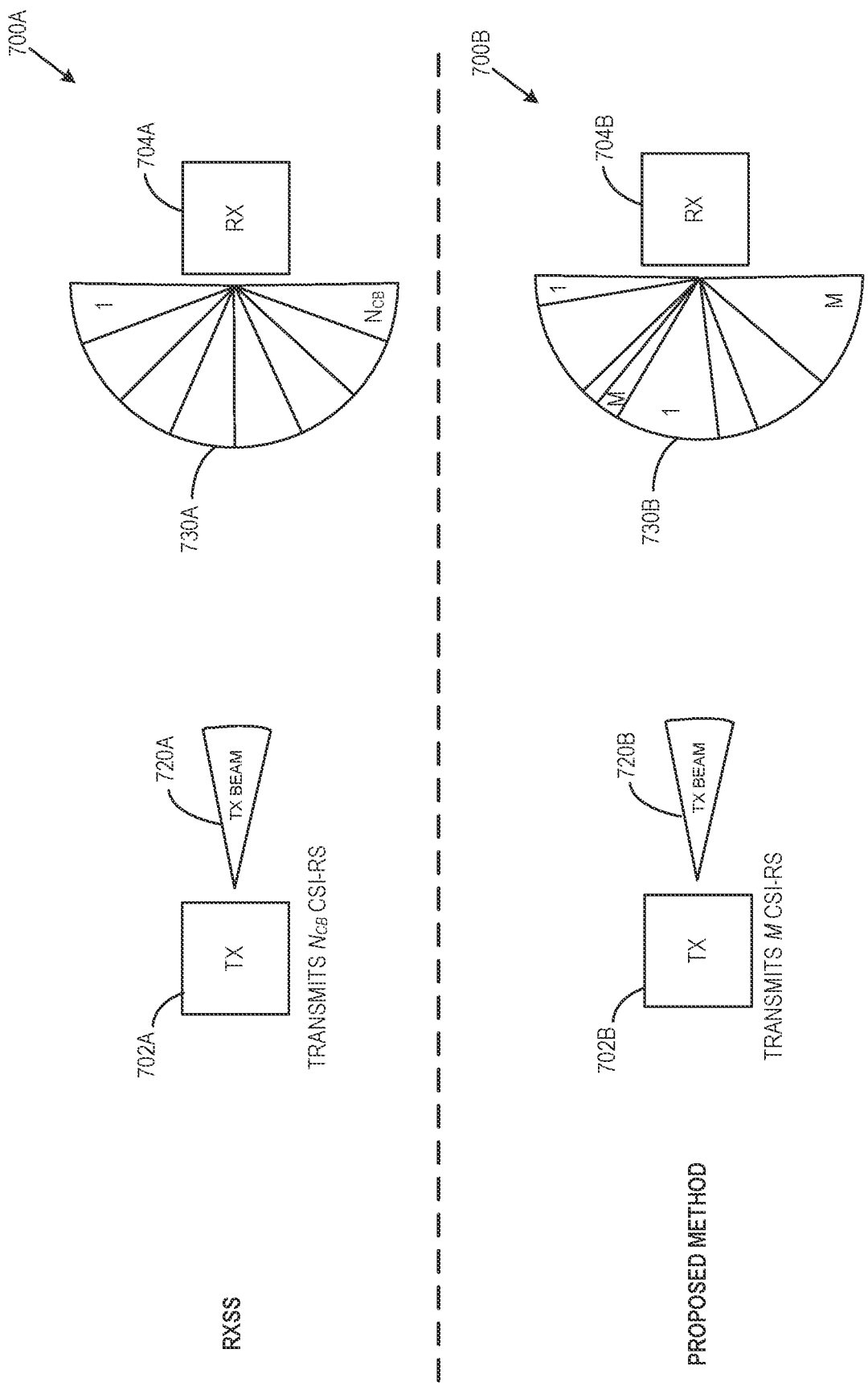
FIG. 7 is a simplified diagram illustrating capture of information about receive beams in a system using a receive sector-level sweep (RXSS) system and a system according to the proposed method.

The measurement combing vectors $a_i$ are designed such that each measurement captures information about a large fraction of the receive beam space. In contrast, during the standard RXSS protocol each measurement only captures information for one beam from the codebook. FIG. 7 illustrates differences between these approaches.

FIG. 7 is a simplified diagram illustrating capture of information about receive beams 730A, 730B in a system 700A using RXSS and a system 700B according to the proposed method. The system 700A includes a transmit node 702A and a receive node 704A. When the transmit node 702A transmits a transmit beam 720A including a pilot signal in the system 700A using RXSS, only information for a single one of the receive beams 730A (corresponding to a single one of the codebook elements) is provided to the receive node 704A. In other words, each measurement captures information for one codebook element.

The system 700B of the proposed method includes a transmit node 702B and a receive node 704B. When the transmit node 702B transmits a transmit beam 720B including a pilot signal in the system 700B, information for a large fraction of the receive beam space 730B is received by the receive node 704B. In other words, each measurement captures information of a large fraction of the receive beam space.

ACK Signaling

To determine if a sufficient number of samples have been collected, each sample is classified as class A (useful) or class B (not useful). Once a given number of measurements has been collected, an ACK is signaled (e.g., signal 610 of FIG. 6) and the receive beam detection process is triggered. The required number of class A samples may be configured by the network or determined in a warm-up phase. The receive node may also report/indicate the number of RXSS resources (one resource per RXSS measurement). As a result, the receive nodes implemented according to embodiments of the disclosure can request fewer UE-RXSS resource than a legacy UE.

Detect Best RX Beam

Based on samples y the receive node can estimate different metrics that can be used to determine the best receive beam. In general, any metric that depends on the effective channel gains $|u^H H w|$, with the channel H, transmit beam w, and potential receive beam u, can be estimated. This is enabled by defining a function g(y,u) that depends on the samples y and a potential receive beam u. The function is chosen to approximate the effective channel gain $|u^H H w| \approx g(y,u)$. The best receive beam can be found by solving the combinatorial optimization problem:

$$\max_{u \in C} g(y, u)$$

where the beamforming codebook is given by C. The function g(y,u) can be realized in different ways. It can be given by a linear function of the form:

$$g(y,u)=|u^H B y|,$$

where B is an $N_R \times M$ matrix possibly depending on the sampling matrix A.

Another class of functions may be given by convex optimization algorithms like the constrained $\ell_1$ minimization commonly found in the context of compressed sensing applications.

Machine learning algorithms can also be used to realize estimation functions. In this case, the function may be trained or learned based on a training set. Ultimately the estimation function shall depend on the available background information, the computational capabilities of the receive node, or other side constraints.

Efficient Interference Management

Consider the downlink of a wireless network with a large number of transmit and receive nodes. Assume that the transmit nodes are connected via a backhaul network that enables fast and reliable sharing of scheduling information, acquired channel state information, and in some embodiments also data sharing. The backhaul network connects all transmit nodes to a central control node that performs radio resource management (RRM). Let the network be sufficiently dense such that with high probability each receive node is within the coverage area of multiple transmit nodes. Assume also that every node is equipped with a large number of antennas (i.e., massive MIMO). To fully exploit the potential of dense wireless networks, transmit nodes acquire channel state information (CSI) from receive nodes within their coverage area. CSI may be used for:

Radio resource management (beam management, scheduling, link adaption, etc.)
Interference management
Handovers from one transmit node to another
Enabling multi-connectivity Acquiring CSI (channel state information) in dense wireless systems with a massive number of antennas is a challenging problem. First, with a large number of transmit antennas using orthogonal resources to measure the channel between any transmit/receive antenna pair is infeasible. Second, wireless systems operating above 6 GHz are likely to employ hybrid digital analog (HDA) transceiver architectures. With an HDA architecture, measuring the signal between any pair of transmit and receive antennas is not possible.

Explicit Feedback

Legacy systems employed explicit feedback of the channel matrix or some function of the channel matrix (e.g., the channel covariance matrix). To measure the channel between a transmit node and receive nodes within the coverage area, pilot signals are broadcasted. To avoid interference between transmit nodes and transmit antennas from the same transmit node, pilot signals are transmitted on orthogonal resources (e.g., different time-frequency resources).

Feedback of Preferred Beamforming Vector

If the beamforming vectors are defined by a codebook, each transmit node may broadcast beamformed pilots, such that each receive node within the coverage area can determine and feed back a set of preferred beamforming vectors. To avoid interference between transmit nodes, pilot signals are transmitted on orthogonal resources (e.g., different time-frequency resources).

Another approach to minimize training and feedback overhead is based on receive node location information. Yet another approach is based on learning techniques that exploit channel correlations of neighboring TX nodes.

Explicit feedback and feedback of a preferred beamforming vector use pilot signals to be transmitted on orthogonal resources (e.g., different time-frequency resources). Using orthogonal pilot resources does not scale well with the number transmit nodes, nor with the number of transmit antennas. These schemes impose an excessive measurement and feedback overhead.

Location based approaches do not perform well in non-line-of-sight scenarios. Moreover, obtaining accurate estimates of the effective channel gain based on location information may not be possible.

Learning based techniques that exploit correlations of neighboring transmit nodes use extensive training overhead to achieve the high CSI accuracy required for tasks such as radio resource management, or other tasks outlined above.

In some embodiments, disclosed herein are systems that use only a small number of coordination cluster specific reference signals to be transmitted. In some embodiments, a sampling and signaling scheme that conveys compressed CSI from receive nodes to transmit nodes and the central controller is disclosed. In some embodiments, an efficient decompression scheme estimates relevant system parameters (e.g., effective channel gains, SINR, strongest interferer, etc.) from compressed CSI measurements. Advantages of these approaches include:

The measurement overhead is significantly reduced since all transmit nodes simultaneously sense the channel using the same spectral resources.
The sensing scheme is non-adaptive (cell/cluster specific) in the sense that the measurement signals can be used by all receive nodes simultaneously.
RRM has similar flexibility as under state-of-the-art explicit feedback schemes. RRM has all degrees of freedom choosing transmit parameters such as scheduled RX nodes, beamforming vectors, modulation and coding schemes, etc.

Figure 8:
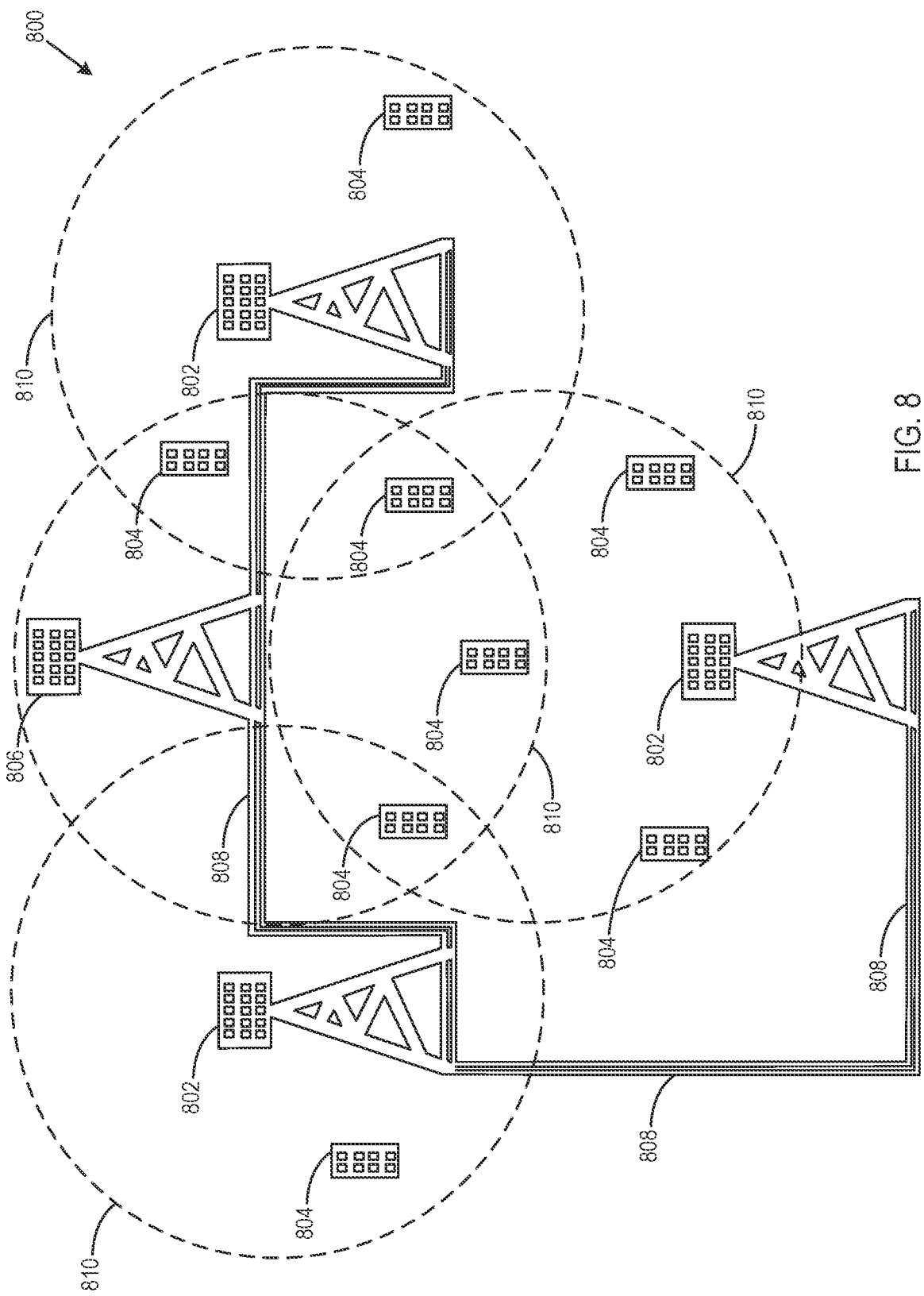
FIG. 8 is a simplified view of a wireless network, according to some embodiments.

FIG. 8 is a simplified view of a wireless network 800, according to some embodiments. In a downlink of the wireless network 800, the wireless network 800 may include a number B of transmit nodes 802 (e.g., base stations) and a number U of receive nodes 804 (e.g., user equipment). Each transmit node 802 is equipped with a number NB of antennas and each receive node 804 is equipped with a number NU of receive antennas.

The transmit nodes 802 may be communicatively coupled to a central control node 806 via a high-capacity and low-latency backhaul network 808. Each of the transmit nodes 802 and the central control node 806 may include a coverage area 810. The central control node 806 performs radio resource management (RRM). The network 800 is assumed to be sufficiently dense such that, with high probability, each receive node 804 is within the coverage area 810 of multiple transmit nodes 802. It is assumed that the transmit nodes 802 are grouped in coordination clusters and, for the ease of presentation, consider a single coordination cluster. All transmit nodes within a coordination cluster are synchronized on a symbol level.

Figure 9:
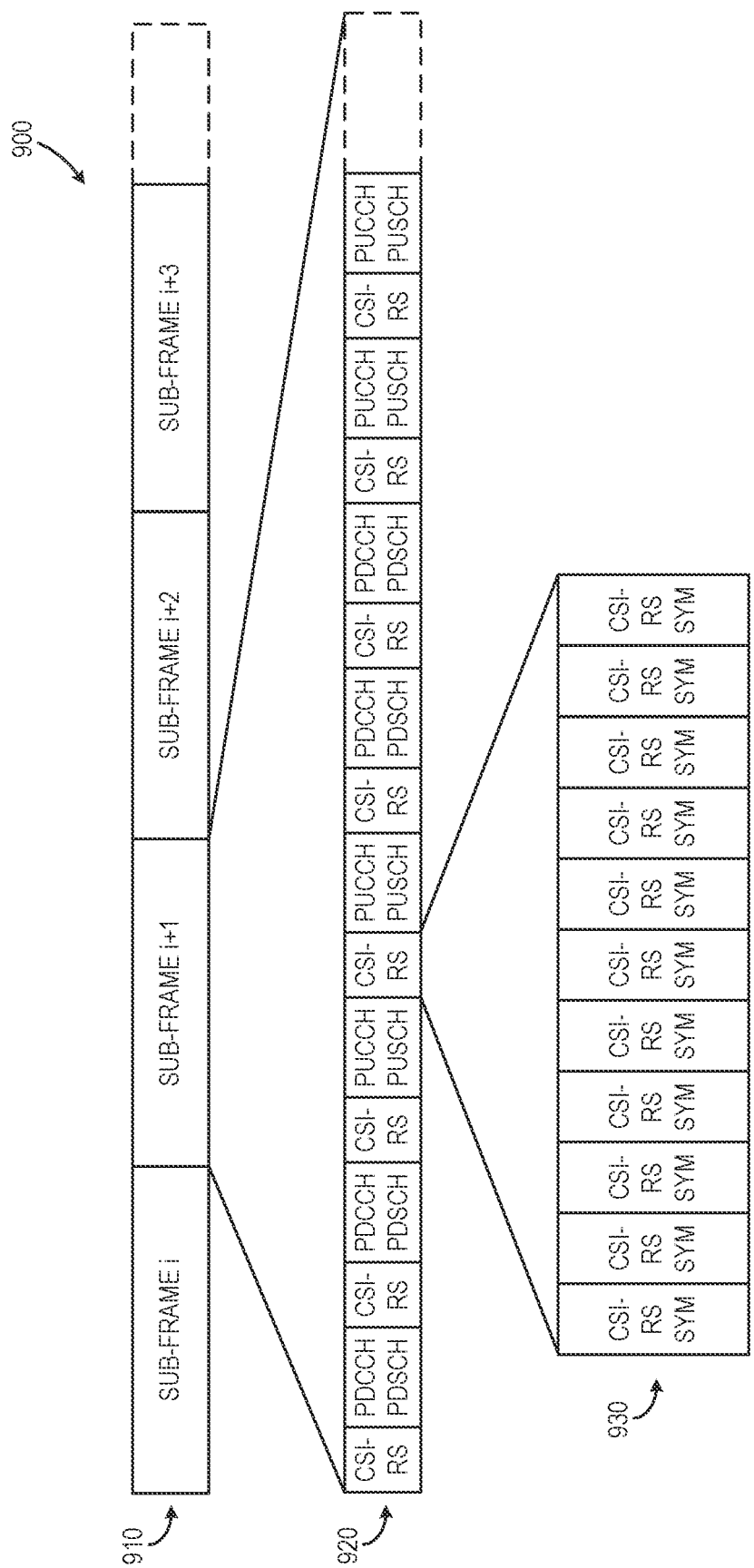
FIG. 9 is a simplified illustration of a frame structure, according to some embodiments.

FIG. 9 is a simplified illustration of a structure of a frame 900, according to some embodiments. A frame 900 is divided into subframes 910; a subframe 910 is divided into multiple slots 920; and a slot includes multiple symbols 930 (e.g., OFDM or single carrier symbols). Within a frame 900, certain slots 920 are reserved for transmission of CSI-RS. The location of CSI-RS slots 920 is known to all transmit nodes 802 and receive nodes 804 (FIG. 8).

Referring once again to FIG. 8, it is assumed that when the receive nodes 804 have successfully performed the initial access procedure, the receive nodes 804 are attached to the network 800 and connected to RRM. The following discussion will discuss a measurement phase, a feedback phase, and a scheduling and data transmission phase. These phases will be discussed in conjunction with FIG. 10.

Figure 10:
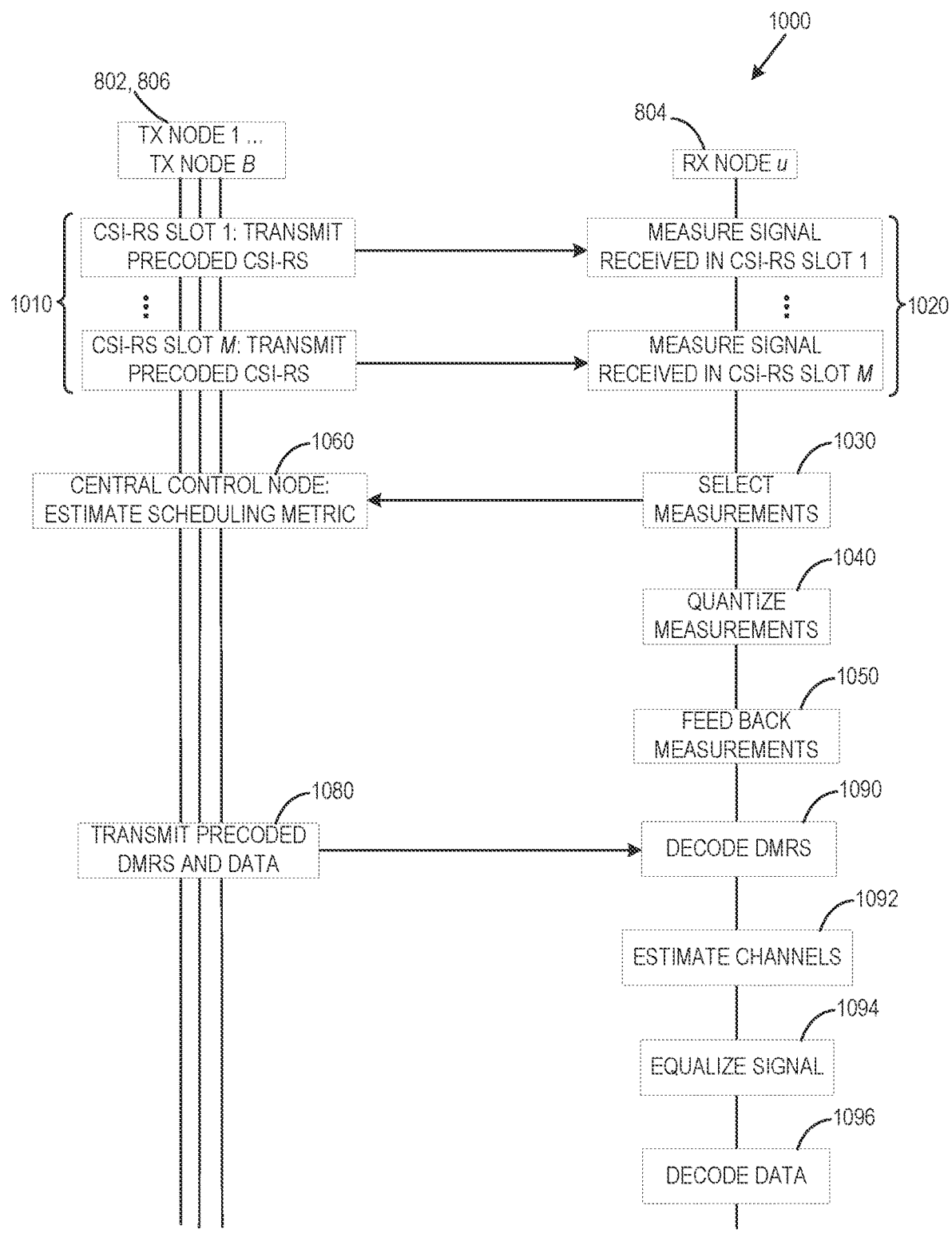
FIG. 10 is a simplified signal flow diagram illustrating a CSI acquisition scheme, according to some embodiments.

FIG. 10 is a simplified signal flow diagram illustrating a CSI acquisition scheme 1000, according to some embodiments.

Measurement Phase

Referring to FIGS. 8 and 10 together, in a given CSI-RS slot i, the transmit nodes 802 simultaneously transmit 1010, to the receive nodes 804, a sequence of M precoded RS signals $\emptyset_{bi} \in \mathbb{C}^{N_b}$ (transmit node b) i=1, . . . , M. The i-th RS signal received by receive node 804 u can be written as:

$$y_{ui} = \Sigma_{b=1}^{B} v_u^* H_{ub} \emptyset_{bi} + v_u^* n_u,$$

with the receive filter $v_u \in \mathbb{C}^{N_u}$ (assumed to be fixed a priori), channel matrix $H_{ub} \in \mathbb{C}^{N_U \times N_B}$ and additive noise $n_u \in \mathbb{C}^{N_U}$. Defining the composite channel matrix $H_{uT} = (H_{u1}, H_{u2}, \ldots, H_{uB}) \in \mathbb{C}^{N_U \times N_B}$ and the composite precoded RS:

$$\emptyset_i = (\emptyset_{1i}^T, \emptyset_{2i}^T, \ldots, \emptyset_{Bi}^T) \in \mathbb{C}^{BN_B},$$

the received signal can be written as:

$$y_{ui} = v_u^* H_u \emptyset_i + v_u^* n_u.$$

After receiving M precoded RS $\Phi = (\emptyset_1, \emptyset_2, \ldots, \emptyset_M)$ the vector of measurements collected by the receive node u is:

$$y_u = v_u^* H_u \Phi + v_u^* n_u.$$

In contrast to legacy CSI acquisition schemes, the measurement protocol uses no orthogonal pilots. In fact, embodiments of the disclosure embrace non-orthogonal RS. Non-orthogonal RS enable each receive node 804, for example u, to measure 1020 a sequence of M projections $v^* H_u \emptyset_{ui}$ of the effective composite channel $v_u^* H_u$. Under certain conditions, the measurement overhead M is significantly smaller than with legacy channel acquisition schemes.

Feedback Phase

With continued reference to FIGS. 8 and 10, receive node u 804 selects 1030 measurements from the vector $y_u$, quantizes 1040 them and feeds them back 1050 to any transmit node 802. Transmit nodes 802 forward the feedback messages to the central control node 806. Hence, the feedback message from the receive node u 804 may be available to the central control node 806. This feedback message can be given by $z_i = f(y_u) + q_i$, where the function $f(y)$ selects certain measurements, and $q_i$ is additional quantization noise. The function $f(y)$ may select the elements of $y_i$ that are above a certain threshold $\varepsilon$ (e.g., $|z_i| > \varepsilon$).

The described feedback protocol differs from legacy feedback schemes in the sense that legacy schemes use measurements to estimate the channel or some representation of the channel prior to generating the feedback message. As a consequence, embodiments disclosed herein enable UEs (receive nodes 804) with less computational capabilities to be employed.

Scheduling and Data Transmission Phase

Based on the feedback messages $z_u$ from multiple receive nodes 804, the central control node 806 is enabled to estimate 1060 a variety of scheduling metrics. In general, any metric that depends on the effective channel gains $|H_u^* w|$, with channel $h_u^* = v_u^* H_u$ and beamforming vector $w \in C$ an element of a beamforming codebook, can be estimated. This is enabled by defining a function $\Psi(z_u, w)$, depending on the quantized measurements $z_u$ and the beamforming vector w, that approximates the effective channel gains $|h_u^* w| \approx \Psi(z_u, w)$. Examples of scheduling metrics include the SINR:

$$SINR_u = \frac{|h_u^* w_u|^2}{1 + \sum_{j \neq u} |h_u^* w_u|^2} \approx \frac{\Psi(z_u, w_u)^2}{1 + \sum_{j \neq u} \Psi(z_u, w_u)^2},$$

where it is assumed that $w_i$ is the beamforming vector assigned to receive node i 804 and $w_j$ are beamforming vectors assigned to interfering UEs (e.g., receive nodes 804) scheduled on the same resource element. Another example may be the leakage interference power $\Sigma_{j \neq u} \Psi(z_u, w_u)^2$, which may be used for interference management.

The estimation function $\Psi(z_u, w_j)$ can be realized in many ways. Ultimately the choice of $\Psi(\cdot, \cdot)$ depends on the structure of the composite channel matrix (i.e., low rankness, sparsity, etc.), desired estimation accuracy, computational power of the central controller, or other system constraints (e.g., latency). The estimation function can be given by a linear function of the form:

$$\Psi(z_i, w_j) = |(\Psi z_i)^H w|,$$

where $\Psi$ is a $BN_B \times M$ matrix possibly depending on the measurement matrix $\Phi$.

Another class of functions may be given by convex optimization algorithms like the constrained $\ell 1$ minimization commonly found in the context of compressed sensing applications. Also, machine learning algorithms can be used to realize estimation functions. In this case, the estimation function may be trained or learned based on a training set.

Figure 11:
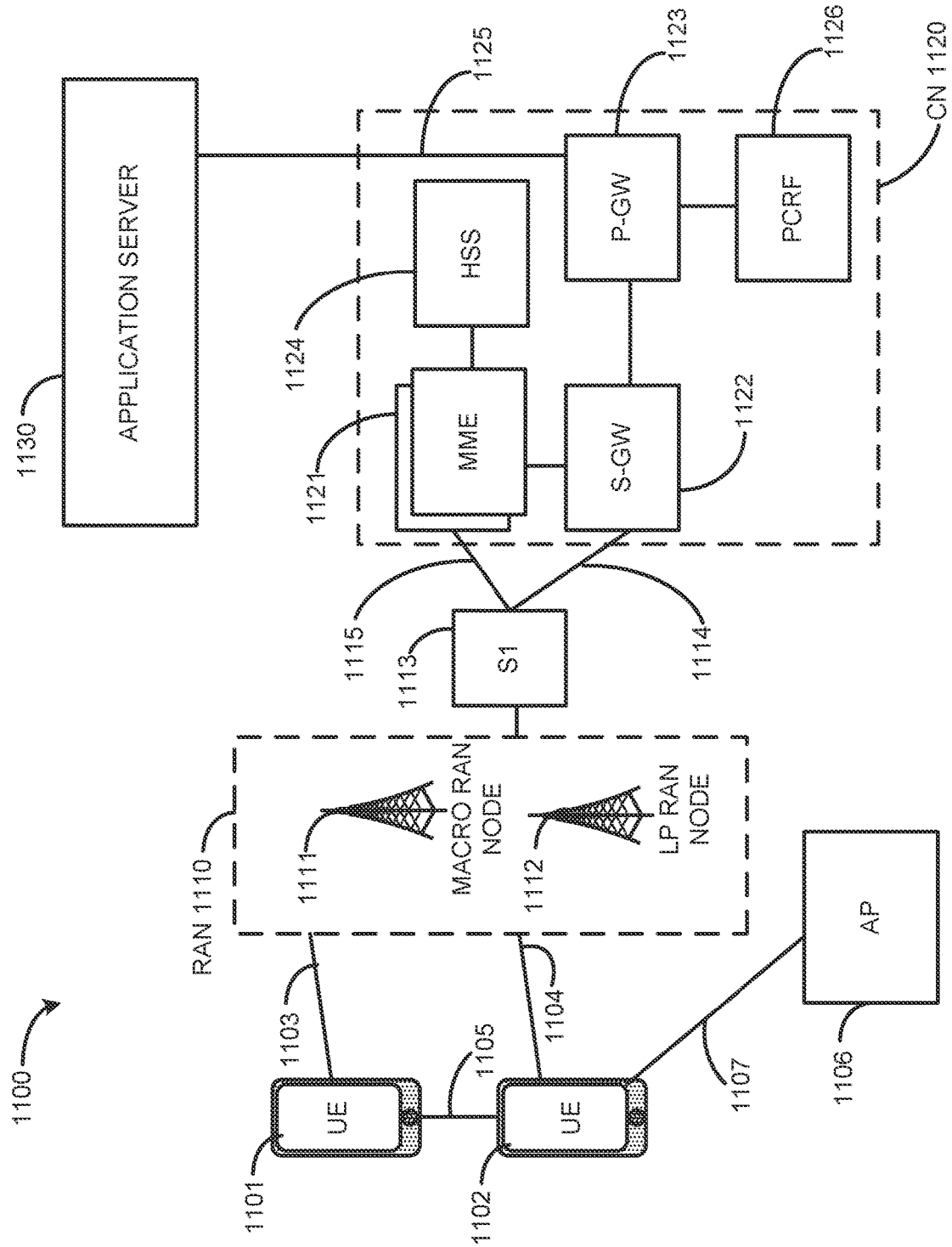
FIG. 11 illustrates an architecture of a system of a network in accordance with some embodiments.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS), a Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 may be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and a serving gateway (S-GW) 1122, and an S1-mobility management entity (MME) interface 1115, which is a signaling interface between the RAN nodes 1111 and 1112 and MMEs 1121.

In this embodiment, the CN 1120 comprises the MMEs 1121, the S-GW 1122, a Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the CN 1120 (e.g., an EPC network) and external networks such as a network including the application server 1130 (alternatively referred to as application function (AF)) via an Internet Protocol (IP) interface 1125. Generally, an application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. A Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
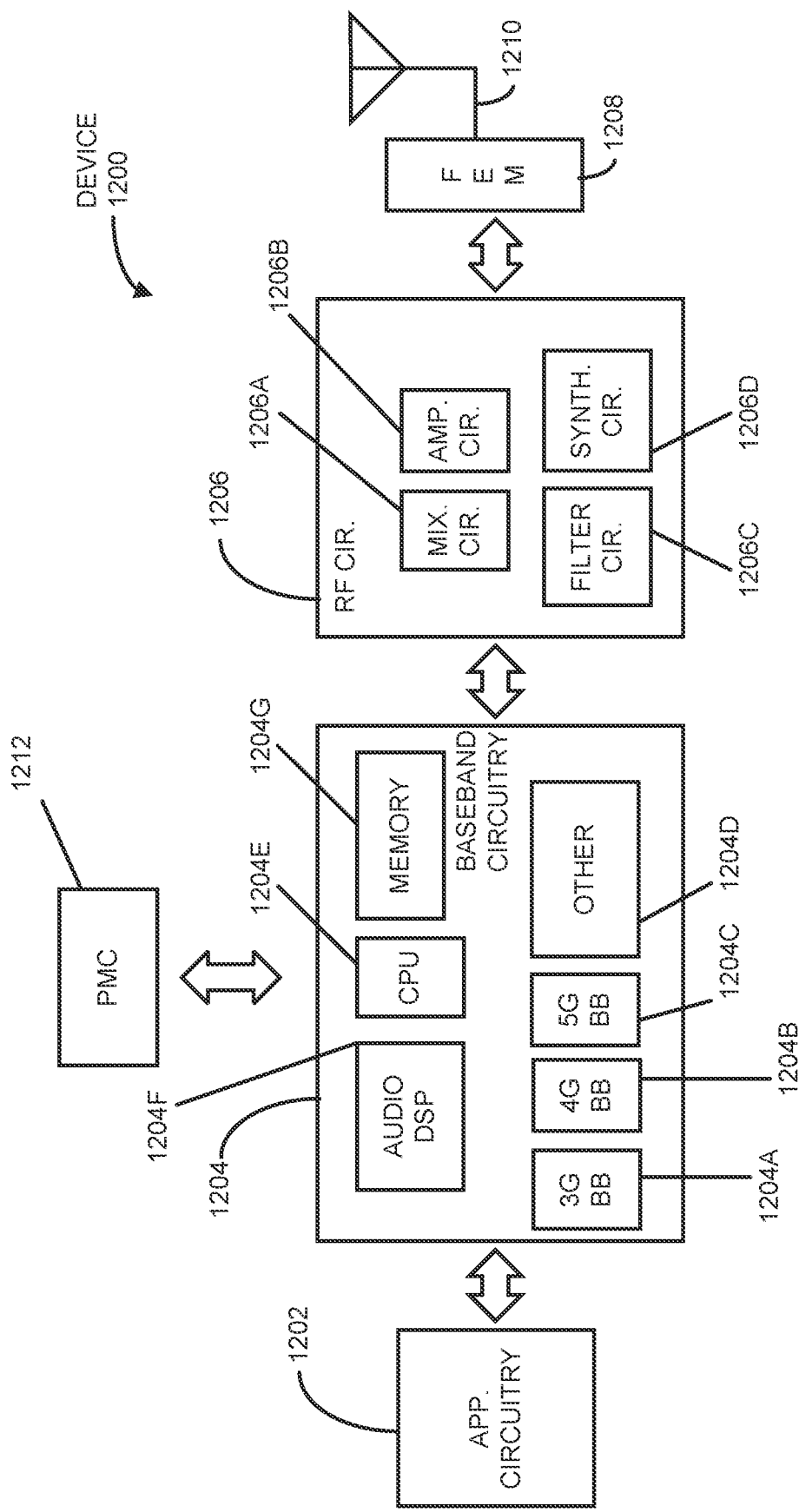
FIG. 12 illustrates example components of a device in accordance with some embodiments.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. The RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206A, amplifier circuitry 1206B and filter circuitry 1206C. In some embodiments, the transmit signal path of the RF circuitry 1206 may include filter circuitry 1206C and mixer circuitry 1206A. RF circuitry 1206 may also include synthesizer circuitry 1206D for synthesizing a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by synthesizer circuitry 1206D. The amplifier circuitry 1206B may be configured to amplify the down-converted signals and the filter circuitry 1206C may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by the filter circuitry 1206C.

In some embodiments, the mixer circuitry 1206A of the receive signal path and the mixer circuitry 1206A of the transmit signal path may include two or more mixers and may be arranged for quadrature downconversion and upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A may be arranged for direct downconversion and direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206D may be a fractional-N synthesizer or a fractional N/N+1 synthesizer, although the scope of the embodiments is not limited in this respect as other types of frequency synthesizers may be suitable. For example, synthesizer circuitry 1206D may be a delta-sigma synthesizer, a frequency multiplier, or a synthesizer comprising a phase-locked loop with a frequency divider.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g., N) may be determined from a look-up table based on a channel indicated by the application circuitry 1202.

Synthesizer circuitry 1206D of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. The FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by the RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device 1200 is included in a UE. The PMC 1212 may increase the power conversion efficiency while providing desirable implementation size and heat dissipation characteristics.

FIG. 12 shows the PMC 1212 coupled only with the baseband circuitry 1204. However, in other embodiments, the PMC 1212 may be additionally or alternatively coupled with, and perform similar power management operations for, other components such as, but not limited to, the application circuitry 1202, the RF circuitry 1206, or the FEM circuitry 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
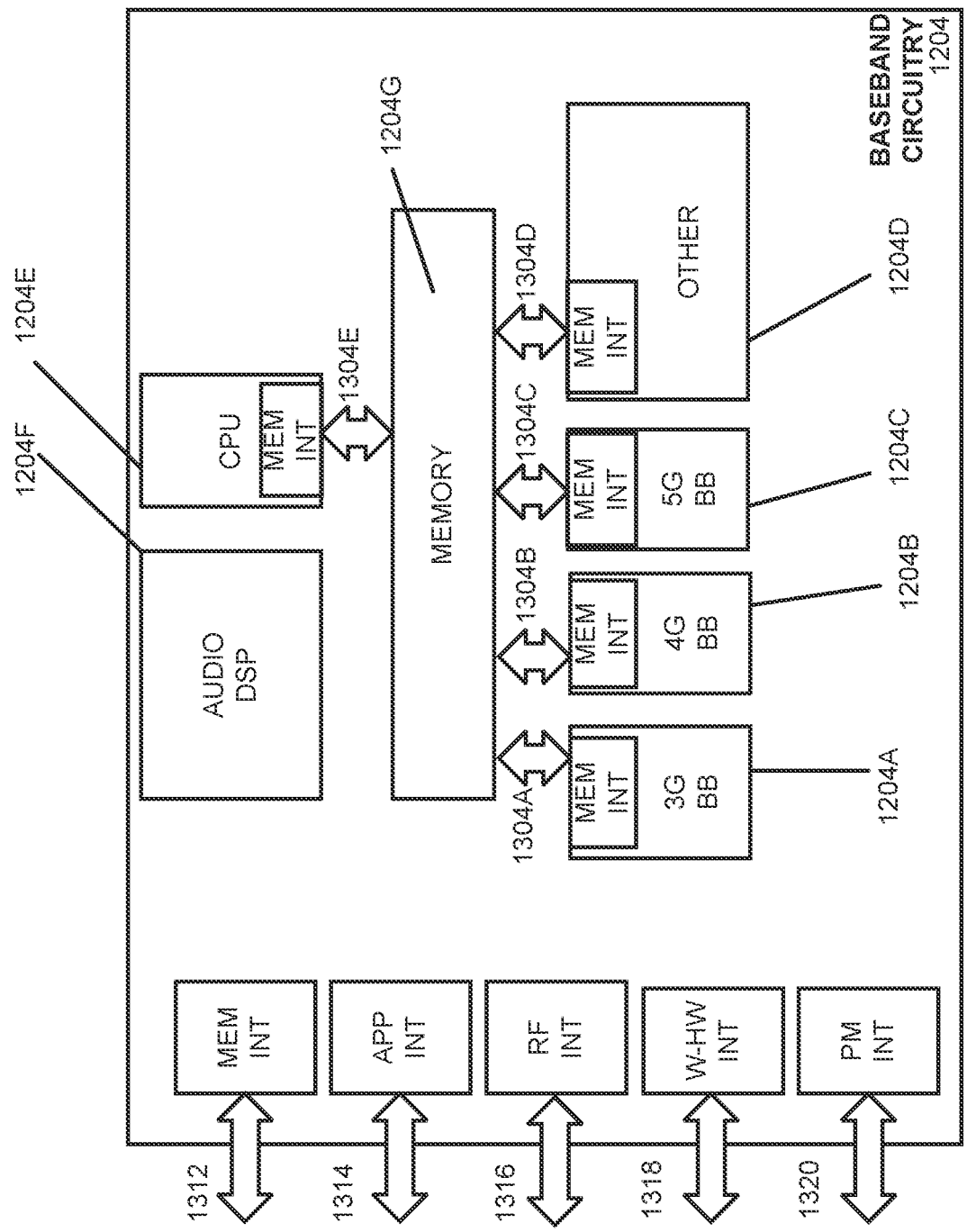
FIG. 13 illustrates example interfaces of baseband circuitry in accordance with some embodiments.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
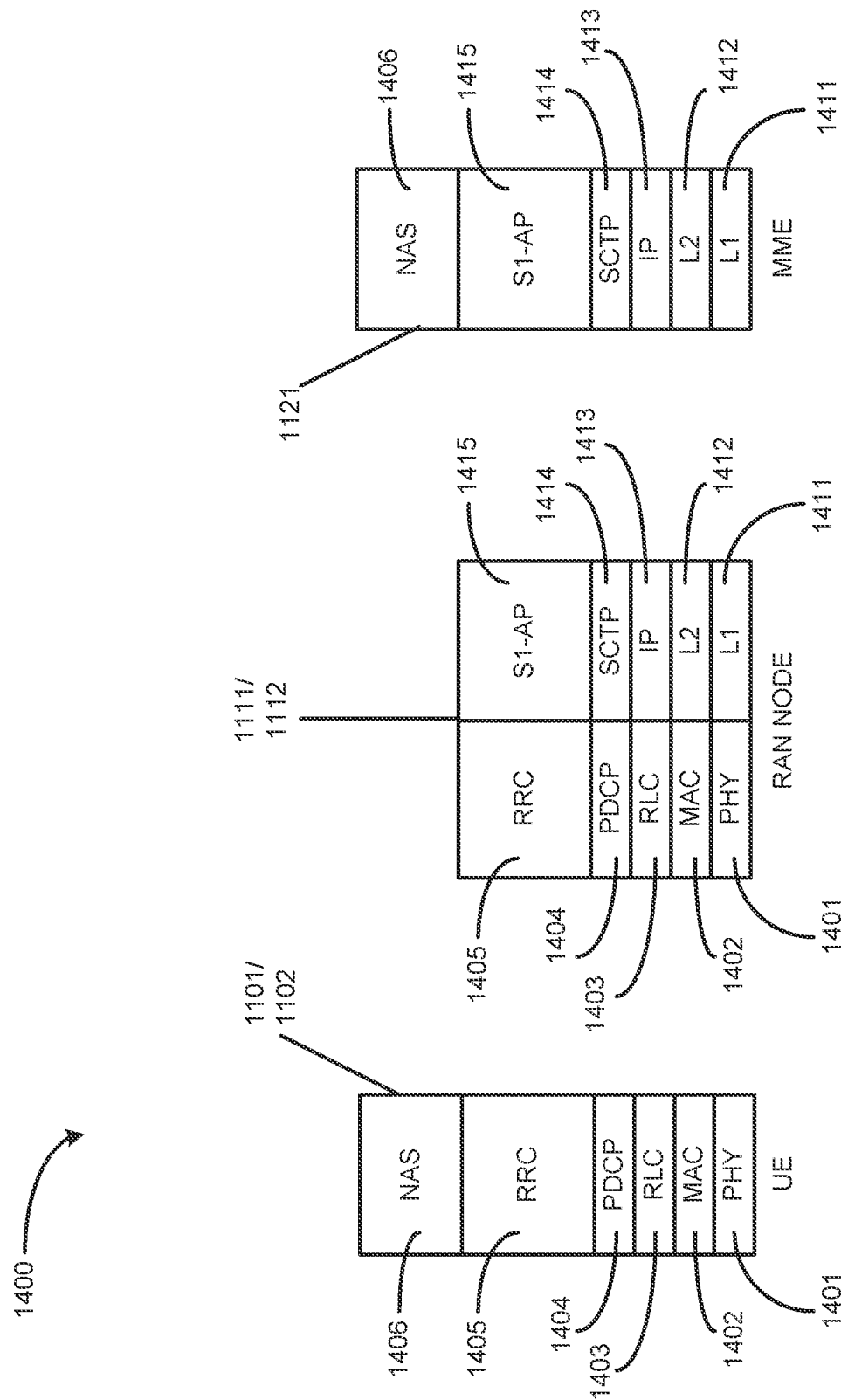
FIG. 14 is an illustration of a control plane protocol stack in accordance with some embodiments.

FIG. 14 is an illustration of a control plane protocol stack in accordance with some embodiments. In this embodiment, a control plane 1400 is shown as a communications protocol stack between the UE 1101 (or alternatively, the UE 1102), the RAN node 1111 (or alternatively, the RAN node 1112), and the MME 1121.

A PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as an RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

An RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1101 and the RAN node 1111 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

In the embodiment shown, the non-access stratum (NAS) protocols 1406 form the highest stratum of the control plane between the UE 1101 and the MME 1121. The NAS protocols 1406 support the mobility of the UE 1101 and the session management procedures to establish and maintain IP connectivity between the UE 1101 and the P-GW 1123.

The S1 Application Protocol (S1-AP) layer 1415 may support the functions of the S1 interface and comprise Elementary Procedures (EPs). An EP is a unit of interaction between the RAN node 1111 and the CN 1120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 1414 may ensure reliable delivery of signaling messages between the RAN node 1111 and the MME 1121 based, in part, on the IP protocol, supported by an IP layer 1413. An L2 layer 1412 and an L1 layer 1411 may refer to communication links (e.g., wired or wireless) used by the RAN node and the MME to exchange information.

The RAN node 1111 and the MME 1121 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
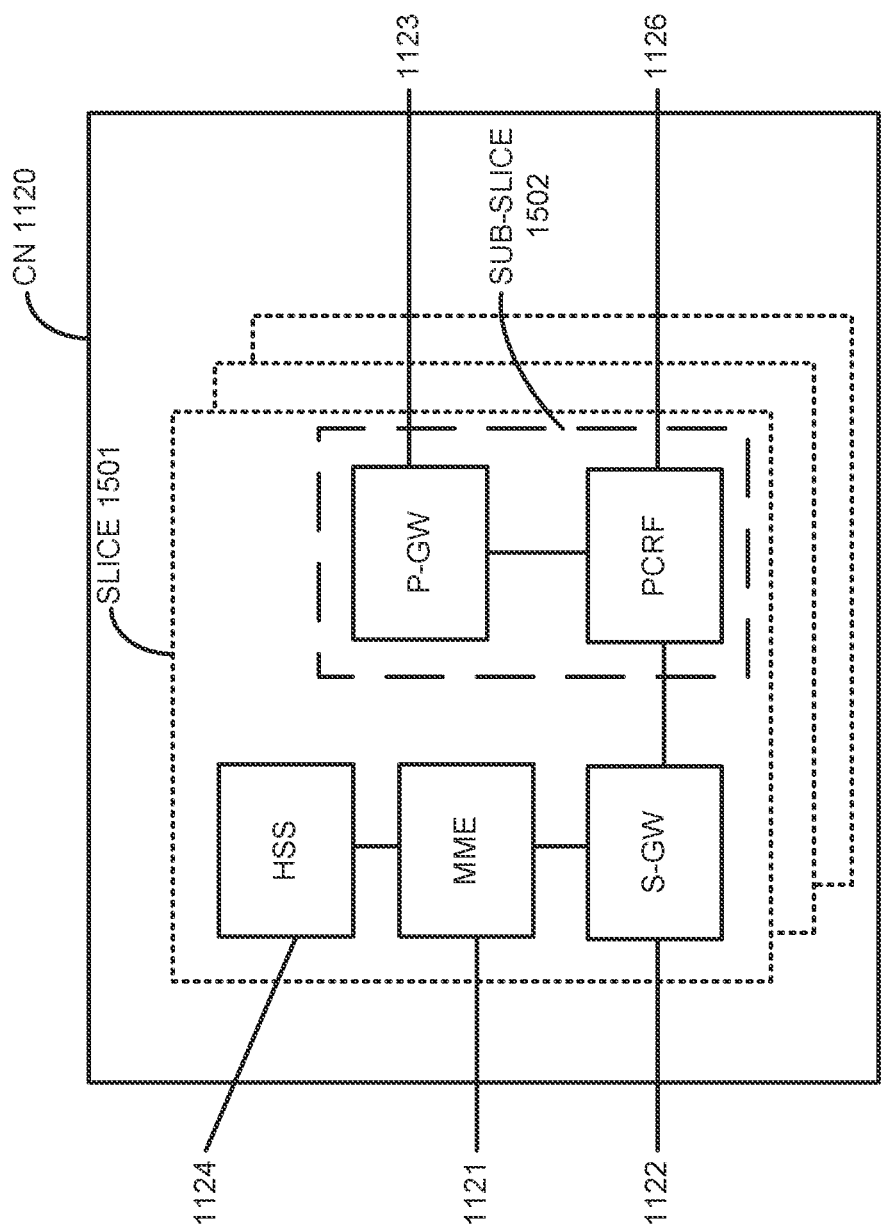
FIG. 15 illustrates components of a core network in accordance with some embodiments.

FIG. 15 illustrates components of a core network in accordance with some embodiments. The components of the CN 1120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1120 may be referred to as a network slice 1501. A logical instantiation of a portion of the CN 1120 may be referred to as a network sub-slice 1502 (e.g., the network sub-slice 1502 is shown to include the P-GW 1123 and the PCRF 1126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 16:
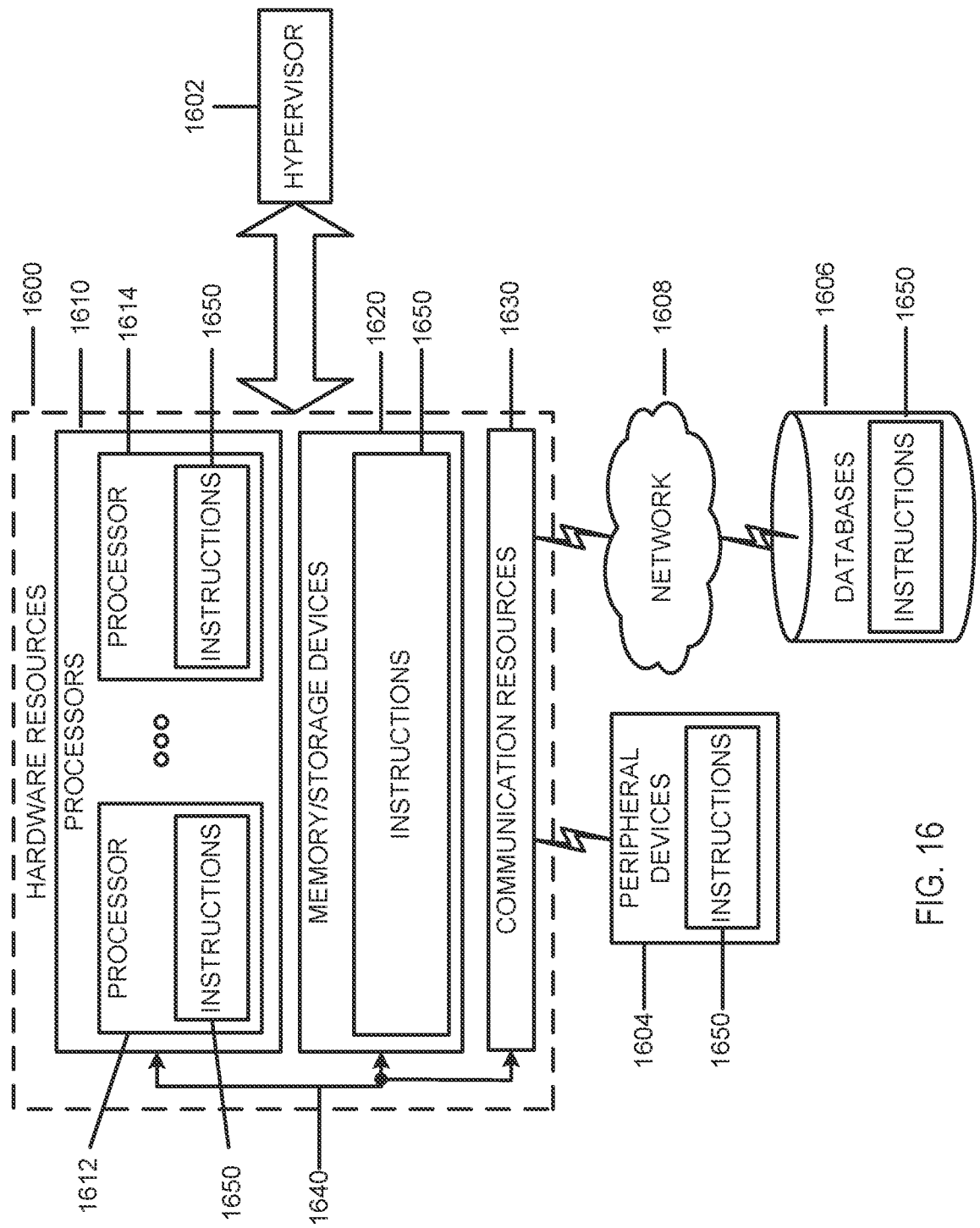
FIG. 16 is a block diagram illustrating components, according to some example embodiments.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For embodiments where node virtualization (e.g., NFV) is utilized, a hypervisor 1602 may be executed to provide an execution environment for one or more network slices/sub-slices to utilize the hardware resources 1600.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

Figure 17:
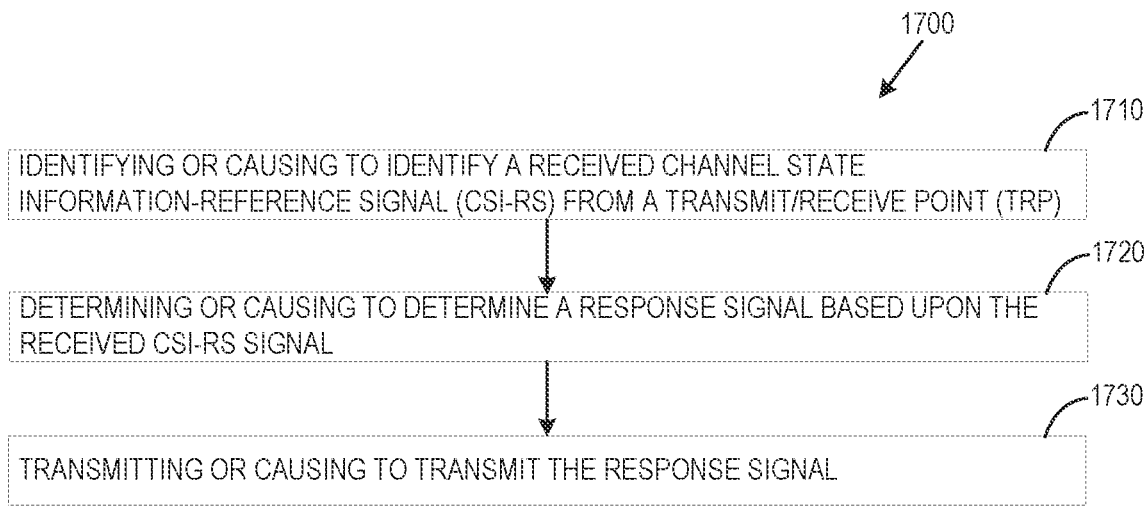
FIG. 17 is a simplified flowchart illustrating a method of operating a wireless communication node, according to some embodiments.

FIG. 17 is a simplified flowchart illustrating a method 1700 of operating a wireless communication node (e.g., a receive node), according to some embodiments. In some embodiments, the device of FIGS. 12 and 16, and particularly the baseband circuitry of FIG. 13, may be configured to identify 1710 or cause to identify a received channel state information-reference signal (CSI-RS) from a Transmit/Receive Point (TRP). The device may be further configured to determine 1720 or cause to determine a response signal based upon the received CSI-RS signal. The device may be further configured to transmit 1730 or cause to transmit the response signal.

Figure 18:
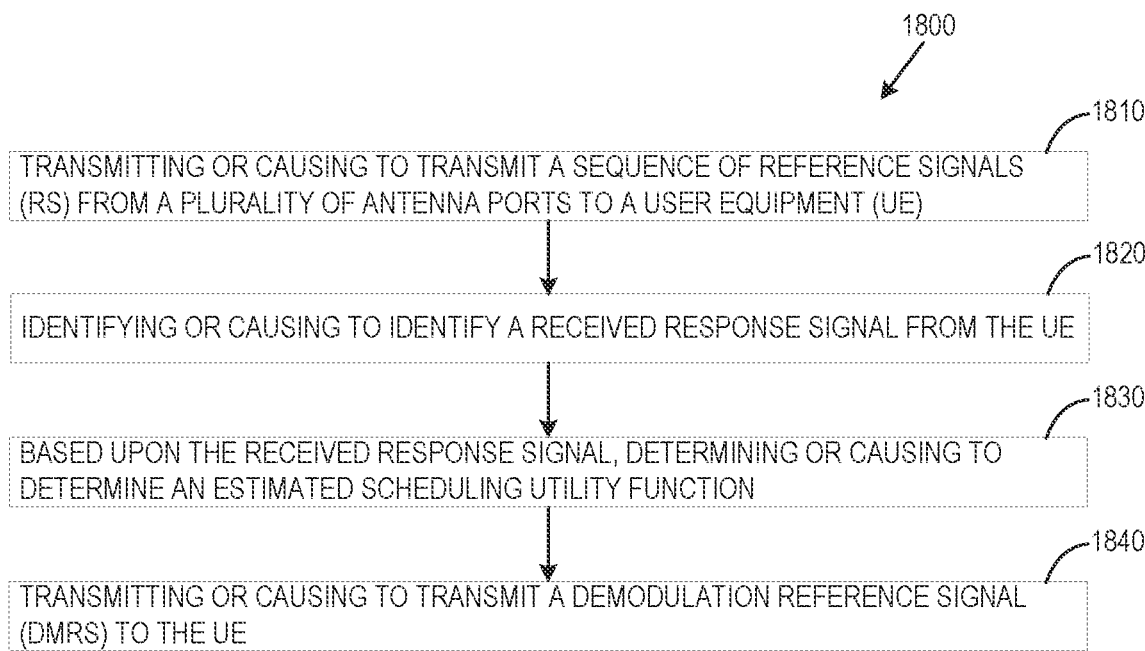
FIG. 18 is a simplified flowchart illustrating a method of operating a wireless communication device, according to some embodiments.

FIG. 18 is a simplified flowchart illustrating a method 1800 of operating a wireless communication device (e.g., a transmit node), according to some embodiments. In embodiments, the device may be configured to transmit 1810 or cause to transmit a sequence of reference signals (RS) from a plurality of antenna ports to a user equipment (UE). The device may be further configured to identify 1820 or cause to identify a received response signal from the UE. The device may be further to, based upon the received response signal, determine 1830 or cause to determine an estimated scheduling utility function. The device may be further configured to transmit 1840 or cause to transmit a demodulation reference signal (DMRS) to the UE.

In some embodiments, the electronic device(s), network(s), system(s), chip(s) or component(s), or portions or implementations thereof, of FIGS. 12, 13, 14, 15, 16, or some other figure herein may be configured to perform one or more processes, techniques, or methods as described herein, or portions thereof. One such process is depicted in FIG. 17, as discussed above.

In some embodiments, the electronic device(s), network(s), system(s), chip(s) or component(s), or portions or implementations thereof, of FIGS. 12, 13, 14, 15, 16, or some other figure herein may be configured to perform one or more processes, techniques, or methods as described herein, or portions thereof. One such process is depicted in FIG. 18, as discussed above.

EXAMPLES

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1 may include a user equipment (UE) apparatus comprising: means for identifying or causing to identify a received channel state information-reference signal (CSI-RS) from a Transmit/Receive Point (TRP); means for determining or causing to determine a response signal based upon the received CSI-RS signal; and means for transmitting or causing to transmit the response signal.

Example 2 may include the subject matter of example 1, or of any other example herein, further including means for identifying or causing to identify a second received signal.

Example 3 may include the subject matter of example 1, or of any other example herein, wherein the means for determining or causing to determine the response signal further includes means for quantizing or causing to quantize the received CSI-RS signal without performing preprocessing, means for quantizing or causing to quantize the received CSI-RS signal with performing preprocessing, or means for quantizing or causing to quantize a subset of the received signal.

Example 4 may include the subject matter of example 3, or of any other example herein, wherein the response signal further includes uplink reference signals to enable the TRP to measure an uplink channel to facilitate received signal equalization by the TRP.

Example 5 may include the subject matter of example 1, or of any other example herein, wherein the means for transmitting or causing to transmit further includes means for transmitting or causing to transmit using multiple antennas.

Example 6 may include the subject matter of example 5, or of any other example herein, wherein the means for transmitting or causing to transmit further includes means for identifying or causing to identify a received beamforming vector prior to transmission.

Example 7 may include the subject matter of example 2, or of any other example herein, wherein the means for identifying or causing to identify a second receive signal further includes means for decoding or causing to decode a demodulation reference signal (DMRS), or means for decoding or causing to decode data.

Example 8 may include a Transmit/Receive Point (TRP) apparatus comprising: means for transmitting or causing to transmit a sequence of reference signals (RS) from a plurality of antenna ports to a user equipment (UE); means for identifying or causing to identify a received response signal from the DE; means for determining or causing to determine an estimated scheduling utility function based upon the received response signal; and means for transmitting or causing to transmit a demodulation reference signal (DMRS) to the DE.

Example 9 may include the subject matter of example 8, or of any other example herein, wherein the means for transmitting or causing to transmit the sequence of RS from a plurality of antenna ports is further for transmitting or causing to transmit a sequence of RS from a plurality of antenna ports simultaneously.

Example 10 may include the subject matter of example 8, or of any other example herein, wherein the means for transmitting or causing to transmit the sequence of RS is further for transmitting or causing to transmit a precoded channel state information (CSI)-RS.

Example 11 may include the subject matter of example 8, or of any other example herein, wherein the received response signal includes quantized DE-received RS based upon the transmitted sequence of RS.

Example 12 may include the subject matter of example 11, or of any other example herein, wherein quantized DE-received RS includes partially quantized DE-received RS.

Example 13 may include the subject matter of example 8, or of any other example herein, wherein the means for transmitting or causing to transmit a sequence of RS is further for transmitting or causing to transmit data streams.

Example 14 may include the subject matter of example 13, or of any other example herein, wherein the means for transmitting or causing to transmit a sequence of RS is further for transmitting or causing to transmit a sequence of RS using a first codebook.

Example 15 may include the subject matter of example 13, or of any other example herein, wherein the means for transmitting or causing to transmit data streams is further for transmitting or causing to transmit data streams using a second codebook.

Example 16 may include the subject matter of examples 13-15, or of any other example herein, wherein the first codebook and the second codebook are a same codebook.

Example 17 may include the subject matter of examples 13-15, or of any other example herein, further including means for uploading or causing to upload the first codebook and/or the second codebook to the TRP.

Example 18 may include the subject matter of example 8, or of any other example herein, wherein means for determining or causing to determine an estimated scheduling utility function is further for determining or causing to determine an estimated scheduling utility function based upon signal-to-noise-plus-interference ratio (SINR), leakage interference power, background information, convex optimization, and/or learning algorithms.

Example 19 may include the subject matter of example 8, or of any other example herein, wherein the estimated scheduling utility function is optimized over different sets of parameters.

Example 20 may include the subject matter of example 8, or of any other example herein, wherein means for transmitting or causing to transmit is further for transmitting or causing to transmit using beamforming.

Example 21 may include a TRP equipped with multiple antenna ports and two codebooks. A first codebook is used to transmit precoded RS and a second codebook is used to precode data streams such that multiple data streams on the same resource element do not interfere.

Example 22 may include the subject matter of example 21 or some other example herein, where the same codebooks are used to transmit RS and data.

Example 23 may include the subject matter of example 21 or some other example herein, where codebooks are loaded/updated if the wireless propagation environment changes.

Example 24 may include a UE equipped with a single antenna that quantizes the received RS and feeds them back to the TRP without performing any preprocessing of the received signal.

Example 25 may include the subject matter of example 24 or some other example herein, where the UE performs some preprocessing of the received signal.

Example 26 may include the subject matter of example 24 or some other example herein, where only a subset of RSs are quantized and fed back.

Example 27 may include the subject matter of example 24 or some other example herein, where the UE is equipped with multiple antennas and fixes a receive beamforming vector beforehand.

Example 28 may include the subject matter of example 24 or some other example herein, where the UE performs no quantization but relays the received signal back to the TRP along with some uplink reference signals, which enable the TRP to measure the uplink channel such that the TRP can equalize the received signal.

Example 29 may include the subject matter of example 24 or some other example herein, where one additional bit is fed back to signal that the measurement codebook needs to be updated by the TRP.

Example 30 may include the method for resource allocation in a wireless network comprising of one or more TRPs and one or more UEs. The method uses feedback information from the UE to estimate a utility function for different transmit parameter sets.

Example 31 may include the subject matter of example 30 or some other example herein, with an algorithm that optimizes the estimated utility function over different sets of parameters.

Example 32 may include the subject matter from example 30 or some other example herein, where the TRP uses additional side information like statistical information about the wireless channels to estimate the network utility function.

Example 33 may include a user equipment (UE) apparatus to: identify or cause to identify a received channel state information-reference signal (CSI-RS) from a Transmit/Receive Point (TRP); determine or cause to determine a response signal based upon the received CSI-RS signal; and transmit or cause to transmit the response signal.

Example 34 may include the subject matter of example 33, or of any other example herein, further including identify or cause to identify a second received signal.

Example 35 may include the subject matter of example 33, or of any other example herein, wherein determine or cause to determine the response signal further includes quantize or cause to quantize the received CSI-RS signal without performing preprocessing, quantize or cause to quantize the received CSI-RS signal with performing preprocessing, and quantize or cause to quantize a subset of the received signal.

Example 36 may include the subject matter of example 35, or of any other example herein, wherein the response signal further includes uplink reference signals to enable the TRP to measure an uplink channel to facilitate received signal equalization by the TRP.

Example 37 may include the subject matter of example 33, or of any other example herein, wherein transmit or cause to transmit further includes transmit or cause to transmit using multiple antennas.

Example 38 may include the subject matter of example 37, or of any other example herein, wherein transmit or cause to transmit further includes identify or cause to identify a received beamforming vector prior to transmission.

Example 39 may include the subject matter of example 34, or of any other example herein, wherein identify or cause to identify a second receive signal further includes decode or cause to decode a demodulation reference signal (DMRS), or decode or cause to decode data.

Example 40 may include Transmit/Receive point (TRP) apparatus to: transmit or cause to transmit a sequence of reference signals (RS) from a plurality of antenna ports to a user equipment (UE); identify or cause to identify a received response signal from the UE; determine or cause to determine an estimated scheduling utility function based upon the received response signal; and transmit or cause to transmit a demodulation reference signal (DMRS) to the UE.

Example 41 may include the subject matter of example 40, or of any other example herein, wherein transmit or cause to transmit a sequence of RS from a plurality of antenna ports further includes transmit or cause to transmit a sequence of RS from a plurality of antenna ports simultaneously.

Example 42 may include the subject matter of example 40, or of any other example herein, wherein transmit or cause to transmit the sequence of RS further includes transmit or cause to transmit a precoded channel state information (CSI)-RS.

Example 43 may include the subject matter of example 40, or of any other example herein, wherein the received response signal includes quantized UE-received RS based upon the transmitted sequence of RS.

Example 44 may include the subject matter of example 43, or of any other example herein, wherein quantized DE-received RS includes partially quantized UE-received RS.

Example 45 may include the subject matter of example 40, or of any other example herein, wherein transmit or cause to transmit a sequence of RS further includes transmit or cause to transmit data streams.

Example 46 may include the subject matter of example 45, or of any other example herein, wherein transmit or cause to transmit a sequence of RS further includes transmit or cause to transmit a sequence of RS using a first codebook.

Example 47 may include the subject matter of example 45, or of any other example herein, wherein transmit or cause to transmit data streams further includes transmit or cause to transmit data streams using a second codebook.

Example 48 may include the subject matter of examples 45-47, or of any other example herein, wherein the first codebook and the second codebook are a same codebook.

Example 49 may include the subject matter of examples 45-47, or of any other example herein, further including uploading or causing to upload the first codebook and/or the second codebook to the TRP.

Example 50 may include the subject matter of example 40, or of any other example herein, determining or causing to determine an estimated scheduling utility function, and further includes determining or causing to determine an estimated scheduling utility function based upon signal-to-noise-plus-interference ratio (SINR), leakage interference power, background information, convex optimization, and/or learning algorithms.

Example 51 may include the subject matter of example 40, or of any other example herein, wherein the estimated scheduling utility function is optimized over different sets of parameters.

Example 52 may include the subject matter of example 40, or of any other example herein, wherein transmitting or causing to transmit further includes transmitting or causing to transmit using beamforming.

Example 53 may include a method for implementing a user equipment (UE) comprising: identifying or causing to identify a received channel state information-reference signal (CSI-RS) from a Transmit/Receive Point (TRP); determining or causing to determine a response signal based upon the received CSI-RS signal; and transmitting or causing to transmit the response signal.

Example 54 may include the subject matter of example 53, or of any other example herein, further including identifying or causing to identify a second received signal.

Example 55 may include the subject matter of example 53, or of any other example herein, wherein determining or causing to determine the response signal further includes quantizing or causing to quantize the received CSI-RS signal without performing preprocessing, quantizing or causing to quantize the received CSI-RS signal with performing pre-processing, or quantizing or causing to quantize a subset of the received signal.

Example 56 may include the subject matter of example 55, or of any other example herein, wherein the response signal further includes uplink reference signals to enable the TRP to measure an uplink channel to facilitate received signal equalization by the TRP.

Example 57 may include the subject matter of example 53, or of any other example herein, wherein transmitting or causing to transmit further includes transmitting or causing to transmit using multiple antennas.

Example 58 may include the subject matter of example 57, or of any other example herein, wherein transmitting or causing to transmit further includes identifying or causing to identify a received beamforming vector prior to transmission.

Example 59 may include the subject matter of example 54, or of any other example herein, wherein identifying or causing to identify a second receive signal further includes decoding or causing to decode a demodulation reference signal (DMRS), or decoding or causing to decode data.

Example 60 may include a method for implementing Transmit/Receive point (TRP) comprising: transmitting or causing to transmit a sequence of reference signals (RS) from a plurality of antenna ports to a user equipment (UE); identifying or causing to identify a received response signal from the UE; based upon the received response signal, determining or causing to determine an estimated scheduling utility function; and transmitting or causing to transmit a demodulation reference signal (DMRS) to the UE.

Example 61 may include the subject matter of example 60, or of any other example herein, wherein transmitting or causing to transmit a sequence of RS from a plurality of antenna ports further includes transmitting or causing to transmit a sequence of RS from a plurality of antenna ports simultaneously.

Example 62 may include the subject matter of example 60, or of any other example herein, wherein transmitting or causing to transmit the sequence of RS further includes transmitting or causing to transmit a precoded channel state information (CSI)-RS.

Example 63 may include the subject matter of example 60, or of any other example herein, wherein the received response signal includes quantized DE-received RS based upon the transmitted sequence of RS.

Example 64 may include the subject matter of example 63, or of any other example herein, wherein quantized DE-received RS includes partially quantized DE-received RS.

Example 65 may include the subject matter of example 60, or of any other example herein, wherein transmitting or causing to transmit a sequence of RS further includes transmitting or causing to transmit data streams.

Example 66 may include the subject matter of example 65, or of any other example herein, wherein transmitting or causing to transmit a sequence of RS further includes transmitting or causing to transmit a sequence of RS using a first codebook.

Example 67 may include the subject matter of example 65, or of any other example herein, wherein transmitting or causing to transmit data streams further includes transmitting or causing to transmit data streams using a second codebook.

Example 68 may include the subject matter of examples 65-67, or of any other example herein, wherein the first codebook and the second codebook are a same codebook.

Example 69 may include the subject matter of examples 65-67, or of any other example herein, further including uploading or causing to upload the first codebook and/or the second codebook to the TRP.

Example 70 may include the subject matter of example 60, or of any other example herein, determining or causing to determine an estimated scheduling utility function further includes determining or causing to determine an estimated scheduling utility function based upon signal-to-noise-plus-interference ratio (SINR), leakage interference power, background information, convex optimization, and/or learning algorithms.

Example 71 may include the subject matter of example 60, or of any other example herein, wherein the estimated scheduling utility function is optimized over different sets of parameters.

Example 72 may include the subject matter of example 60, or of any other example herein, wherein transmitting or causing to transmit further includes transmitting or causing to transmit using beamforming.

Example 73 may include an apparatus comprising means to perform one or more elements of a method described in or related to any of examples 1-72, or any other method or process described herein.

Example 74 may include one or more non-transitory computer-readable media comprising instructions to cause an electronic device, upon execution of the instructions by one or more processors of the electronic device, to perform one or more elements of a method described in or related to any of examples 1-72, or any other method or process described herein.

Example 75 may include an apparatus comprising logic, modules, or circuitry to perform one or more elements of a method described in or related to any of examples 1-72, or any other method or process described herein.

Example 76 may include a method, technique, or process as described in or related to any of examples 1-72, or portions or parts thereof.

Example 77 may include an apparatus comprising: one or more processors and one or more computer readable media comprising instructions that, when executed by the one or more processors, cause the one or more processors to perform the method, techniques, or process as described in or related to any of examples 1-72, or portions thereof.

Example 78 may include a method of communicating in a wireless network as shown and described herein.

Example 79 may include a system for providing wireless communication as shown and described herein.

Example 80 may include a device for providing wireless communication as shown and described herein.

Example 81: An apparatus of a wireless communication device, comprising: circuitry (e.g., radio frequency circuitry) configured to measure reference signals received from a plurality of antennas of an other wireless communication device; and circuitry (e.g., processing circuitry) configured to cause one or more antennas of the wireless communication device to transmit information regarding the received reference signals back to the other wireless communication device to enable the other wireless communication device to estimate a utility function for different transmit parameter sets.

Example 82: The apparatus of Example 81, wherein the circuitry configured to cause the one or more antennas of the wireless communication device to transmit the information regarding the received reference signals is further configured to perform some pre-processing of the reference signals to reduce processing at the other wireless communication device to estimate the utility function.

Example 83: The apparatus of Example 81, wherein the circuitry configured to cause the one or more antennas of the wireless communication device to transmit the information regarding the received reference signals is further configured to quantize the reference signals, and the information regarding the received reference signals comprises data indicating the quantized reference signals.

Example 84: wherein the one or more antennas of the wireless communication device comprise multiple antennas and the circuitry configured to cause the one or more antennas of the wireless communication device to transmit the information regarding the received reference signals is further configured to fix a receive beamforming vector before the reference signals are received.

Example 85: The apparatus of Example 81, wherein the information regarding the received reference signals comprises the reference signals themselves that have not been quantized by the circuitry configured to cause the one or more antennas of the wireless communication device to transmit the information regarding the received reference signals.

Example 86: The apparatus according to any one of Examples 81-85, wherein the circuitry configured to cause the one or more antennas of the wireless communication device to transmit the information regarding the received reference signals is further configured to generate other reference signals and control the one or more antennas to transmit the other reference signals to the other wireless communication device to enable the other wireless communication device to measure the uplink channel.

Example 87: The apparatus according to any one of Examples 81-85, wherein the circuitry configured to cause the one or more antennas of the wireless communication device to transmit the information regarding the received reference signals is further configured to determine whether a codebook used to generate the reference signals at the other wireless communication device should be updated, and control the radio frequency circuitry and the one or more antennas to indicate to the other wireless communication device that the codebook should be updated.

Example 88: The apparatus according to any one of Examples 81-85, wherein the wireless communication device includes a user equipment (UE) and the other wireless communication device includes a cellular base station.

Example 89: An apparatus of a cellular base station, comprising: a data storage device configured to store data corresponding to a first codebook and a second codebook, the first codebook different from the second codebook; and one or more processors configured to: precode reference signals to be transmitted to a user equipment (UE); and precode, using the second codebook, data streams on a common resource element to prevent the data streams from interfering with each other.

Example 90: The apparatus of Example 89, wherein one or more of the first codebook or the second codebook is updated or replaced with a different codebook responsive to: a determination that a wireless propagation environment between the cellular base station and the UE has changed; or an indication by the UE that the wireless propagation environment has changed.

Example 91: An apparatus of a Radio Access Network (RAN) node, comprising: a data storage device configured to store data corresponding to feedback information received from a UE; and processing circuitry configured to: estimate a utility function for different transmit parameter sets based on the feedback information received from the UE; and generate reference signals to be transmitted to the UE, the feedback information indicating information regarding measured signals measured by the UE responsive to transmission of the reference signals to the UE.

Example 92: The apparatus of Example 91, wherein the processing circuitry is configured to use a first codebook to precode the reference signals and a second codebook to precode data streams to be transmitted to the UE.

Example 93: The apparatus of Example 92, wherein the first codebook is the same as the second codebook.

Example 94: The apparatus according to any one of Examples 91-93, wherein the processing circuitry is configured to optimize the estimated utility function for the different transmit parameter sets.

Example 95: The apparatus according to any one of Examples 91-93, wherein the processing circuitry is configured to take into consideration statistical information about a wireless channel to estimate the utility function.

Example 96: An apparatus of a user equipment (UE), comprising: a data storage device configured to store a first beamforming codebook and a second beamforming codebook that is different from the first beamforming codebook; and processing circuitry configured to: use the first beamforming codebook to reduce or compress dimensions of a receive beam space of a plurality of antennas of the UE; and use the second beamforming codebook to filter data bearing signals received from a cellular base station.

Example 97: The apparatus of Example 96, wherein the processing circuitry is configured to transition to use a third beamforming codebook instead of one or more of the first beamforming codebook or the second beamforming codebook responsive to a change in a signal propagation environment.

Example 98: The apparatus of Example 96, wherein the one or more processors are configured to generate a message to be transmitted to a cellular base station, the message configured to indicate a number of reference signals that are to be transmitted by the cellular base station.

Example 99: The apparatus of Example 98, wherein the processing circuitry is configured to generate the message to be transmitted to multiple cellular base stations.

Example 100: The apparatus according to any one of Example 96-99, wherein the processing circuitry is configured to: estimate an effective channel gain for one or more beam pairs; and generate a message to be transmitted to a cellular base station, the message indicating the estimated effective channel gain.

Example 101: The apparatus according to any one of Examples 96-99, wherein the processing circuitry is configured to determine an optimal receive beam from the second beamforming codebook based on measurements of reference signals received from a cellular base station while using the first beamforming codebook.

Example 102: An apparatus of a user equipment (UE), comprising: a data storage device configured to store sample data indicating information measured from a uniformly sampled receive beam space; and one or more processors configured to: estimate one or more parameters of a plurality of receive beams of a codebook based on the stored samples; select a receive beam from a codebook based on the estimated one or more parameters; and receive data from a cellular base station using the selected receive beam.

Example 103: The apparatus of Example 102, wherein the one or more processors are configured to generate an acknowledgement (ACK) message to be transmitted to the cellular base station, the ACK message indicating that a quality of samples of the uniformly sampled receive beam space is sufficient.

Example 104: The apparatus of Example 103, wherein the one or more processors are configured to classify some of the samples of the uniformly sampled receive beam space as useful and others of the samples of the uniformly sampled receive beam space as not useful.

Example 105: The apparatus according to any one of Examples 102-104, wherein the one or more parameters used to select the receive beam from the codebook are determined by defining a function that depends on the sample data and a potential receive beam, the function chosen to approximate an effective channel gain.

It will be apparent to those having skill in the art that many changes may be made to the details of the above-described embodiments without departing from the underlying principles of the disclosure. The scope of the present disclosure should, therefore, be determined only by the following claims.

The invention claimed is:

1. A user equipment (UE), comprising:
a data storage device configured to store a first beamforming codebook that corresponds to a plurality of antennas of the UE; and
processing circuitry configured to:
generate one or more measurements of a receive beam space of the first beamforming codebook according to reduced or compressed dimensions for the receive beam space of the first beamforming codebook, wherein a number of the one or more measurements is less than a number of receive beams of the first beamforming codebook, the one or more measurements corresponding to the entire beam space;
determine a best receive beam of the first beamforming codebook based on the one or more measurements; and
use the best receive beam of the first beamforming codebook to receive data bearing signals from a cellular base station.

2. The UE of claim 1, wherein the processing circuitry is further configured to transition to use a second beamforming codebook instead of the first beamforming codebook responsive to a change in a signal propagation environment.

3. The UE of claim 1, wherein the processing circuitry is further configured to generate a message to be transmitted to the cellular base station, the message configured to indicate a number of reference signals that are to be transmitted by the cellular base station.

4. The UE of claim 3, wherein the processing circuitry is further configured to generate the message to be transmitted to multiple cellular base stations.

5. The UE of claim 1, wherein the processing circuitry is further configured to:
estimate an effective channel gain for one or more beam pairs; and
generate a message to be transmitted to the cellular base station, the message indicating the estimated effective channel gain.

6. The UE of claim 1, wherein the one or more measurements are generated based on measurements of reference signals received from the cellular base station and the best receive beam is determined based on a combinational optimization between the one or more measurements and potential receive beams of the first beam forming codebook to maximize effective channel gain.

7. A non-transitory computer-readable storage medium, the non- transitory computer-readable storage medium including instructions that, when executed by one or more processors of a user equipment (UE), cause the one or more processors to:
store a first beamforming codebook that corresponds to a plurality of antennas of the UE;
generate one or more measurements of a receive beam space of the first beamforming codebook according to reduced or compressed dimensions for the receive beam space of the first beamforming codebook, wherein a number of the one or more measurements is less than a number of receive beams of the first beamforming codebook, the one or more measurements corresponding to the entire beam space;
determine a best receive beam of the first beamforming codebook based on the one or more measurements; and
use the best receive beam of the first beamforming codebook to receive data bearing signals from a cellular base station.

8. The non-transitory computer-readable storage medium of claim 7, wherein the instructions, when executed, further cause the one or more processors to transition to use a second beamforming codebook instead of the first beamforming codebook responsive to a change in a signal propagation environment.

9. The non-transitory computer-readable storage medium of claim 7, wherein the instructions, when executed, further cause the one or more processors to generate a message to be transmitted to the cellular base station, the message configured to indicate a number of reference signals that are to be transmitted by the cellular base station.

10. The non-transitory computer-readable storage medium of claim 9, wherein the instructions, when executed, further cause the one or more processors to generate the message to be transmitted to multiple cellular base stations.

11. The non-transitory computer-readable storage medium of claim 7, wherein the instructions, when executed, further cause the one or more processors to:
estimate an effective channel gain for one or more beam pairs; and
generate a message to be transmitted to the cellular base station, the message indicating the estimated effective channel gain.

12. The non-transitory computer-readable storage medium of claim 7, wherein the one or more measurements are generated based on measurements of reference signals received from the cellular base station and the best receive beam is determined based on a combinational optimization between the one or more measurements and potential receive beams of the first beam forming codebook to maximize effective channel gain.

13. A method for a user equipment (UE), the method comprising:
storing a first beamforming codebook that corresponds to a plurality of antennas of the UE;
generating one or more measurements of a receive beam space of the first beamforming codebook according to reduced or compressed dimensions for the receive beam space of the first beamforming codebook, wherein a number of the one or more measurements is less than a number of receive beams of the first beamforming codebook, the one or more measurements corresponding to the entire beam space;
determining a best receive beam of the first beamforming codebook based on the one or more measurements; and using the best receive beam of the first beamforming codebook to receive data bearing signals from a cellular base station.

14. The method of claim 13, further comprising using a second beamforming codebook instead of the first beamforming codebook responsive to a change in a signal propagation environment.

15. The method of claim 13, further comprising generating a message to be transmitted to the cellular base station, the message configured to indicate a number of reference signals that are to be transmitted by the cellular base station.

16. The method of claim 15, further comprising generating the message to be transmitted to multiple cellular base stations.

17. The method of claim 13, further comprising:
estimating an effective channel gain for one or more beam pairs; and
generating a message to be transmitted to the cellular base station, the message indicating the estimated effective channel gain.

18. The method of claim 13, wherein the one or more measurements are generated based on measurements of reference signals received from the cellular base station and the best receive beam is determined based on a combinational optimization between the one or more measurements and potential receive beams of the first beam forming codebook to maximize effective channel gain.

* * * * *